US008510445B2

(12) United States Patent
Sugauchi et al.

(10) Patent No.: US 8,510,445 B2
(45) Date of Patent: Aug. 13, 2013

(54) SYSTEM MANAGEMENT METHOD AND SYSTEM MANAGEMENT APPARATUS

(75) Inventors: Kiminori Sugauchi, Yokohama (JP); Atsuya Kumagai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 12/836,966

(22) Filed: Jul. 15, 2010

(65) Prior Publication Data

US 2011/0286328 A1  Nov. 24, 2011

(30) Foreign Application Priority Data

May 20, 2010  (JP) ................................ 2010-116536

(51) Int. Cl.
 *G06F 15/173* (2006.01)
(52) U.S. Cl.
 USPC ........................... 709/226; 709/220; 709/238
(58) Field of Classification Search
 None
 See application file for complete search history.

(56) References Cited

U.S. PATENT DOCUMENTS

| 5,537,394 | A | 7/1996 | Abe et al. | |
| 6,711,137 | B1 * | 3/2004 | Klassen et al. | 370/252 |
| 7,069,177 | B2 * | 6/2006 | Carley | 702/179 |
| 2005/0083848 | A1 | 4/2005 | Shao et al. | |
| 2008/0086731 | A1 * | 4/2008 | Trossman et al. | 718/100 |
| 2008/0162839 | A1 | 7/2008 | Nakamichi et al. | |

FOREIGN PATENT DOCUMENTS

| JP | 7-131456 | 5/1995 |
| JP | 7-245626 | 9/1995 |
| JP | 2005-136982 | 5/2005 |
| JP | 2005-266933 | 9/2005 |

\* cited by examiner

*Primary Examiner* — Gilberto Barron, Jr.
*Assistant Examiner* — Jaron K Brunner
(74) *Attorney, Agent, or Firm* — Brundidge & Stanger, P.C.

(57) ABSTRACT

Provided is an IT system to minimize occurrence of a bottleneck on a network while effectively making use of the bandwidth of the network. A system management apparatus collects performance information from a network device, and calculates the average value, the peak hour, and the variance from the collected performance information. In response to a request for addition of a business system, the system management apparatus builds configuration patterns of a group of virtual servers configuring the business system and monitors traffic states of the paths on the network, identifies the part of the network where the traffic quality is most degraded, and determines the pattern that includes the path which has the smallest variance in the traffic based on traffic information on the part where the communication quality is degraded identified in each pattern as the requested system configuration of the business system.

18 Claims, 16 Drawing Sheets

FIG. 3

| Switch | IP-SW2 | Port | 1 |
|---|---|---|---|
| Opposite switch | IP-SW3 | Opposite port | 4 |
| Statistical data | | | | |

| Time | Average | Upper limit | Lower limit | Variance |
|---|---|---|---|---|
| 2010/4/1 12:00 | 500(Mbps) | 900(Mbps) | 200(Mbps) | 200 |
| 2010/4/1 15:00 | 600 | 800 | 400 | 130 |
| 2010/4/1 18:00 | 400 | 500 | 300 | 135 |
| : | : | : | : | : |

FIG. 4

| SAN switch | SAN-SW2 | Port | 2 |
|---|---|---|---|
| Opposite switch | Server B | Opposite port | 1 |
| Statistical data | | | |

| Time | Average | Upper limit | Lower limit | Variance |
|---|---|---|---|---|
| 2010/4/1 12:00 | 50(MBps) | 70(MBps) | 10(MBps) | 10 |
| 2010/4/1 15:00 | 40 | 70 | 10 | 15 |
| 2010/4/1 18:00 | 76 | 85 | 70 | 4 |
| ⋮ | ⋮ | ⋮ | ⋮ | ⋮ |

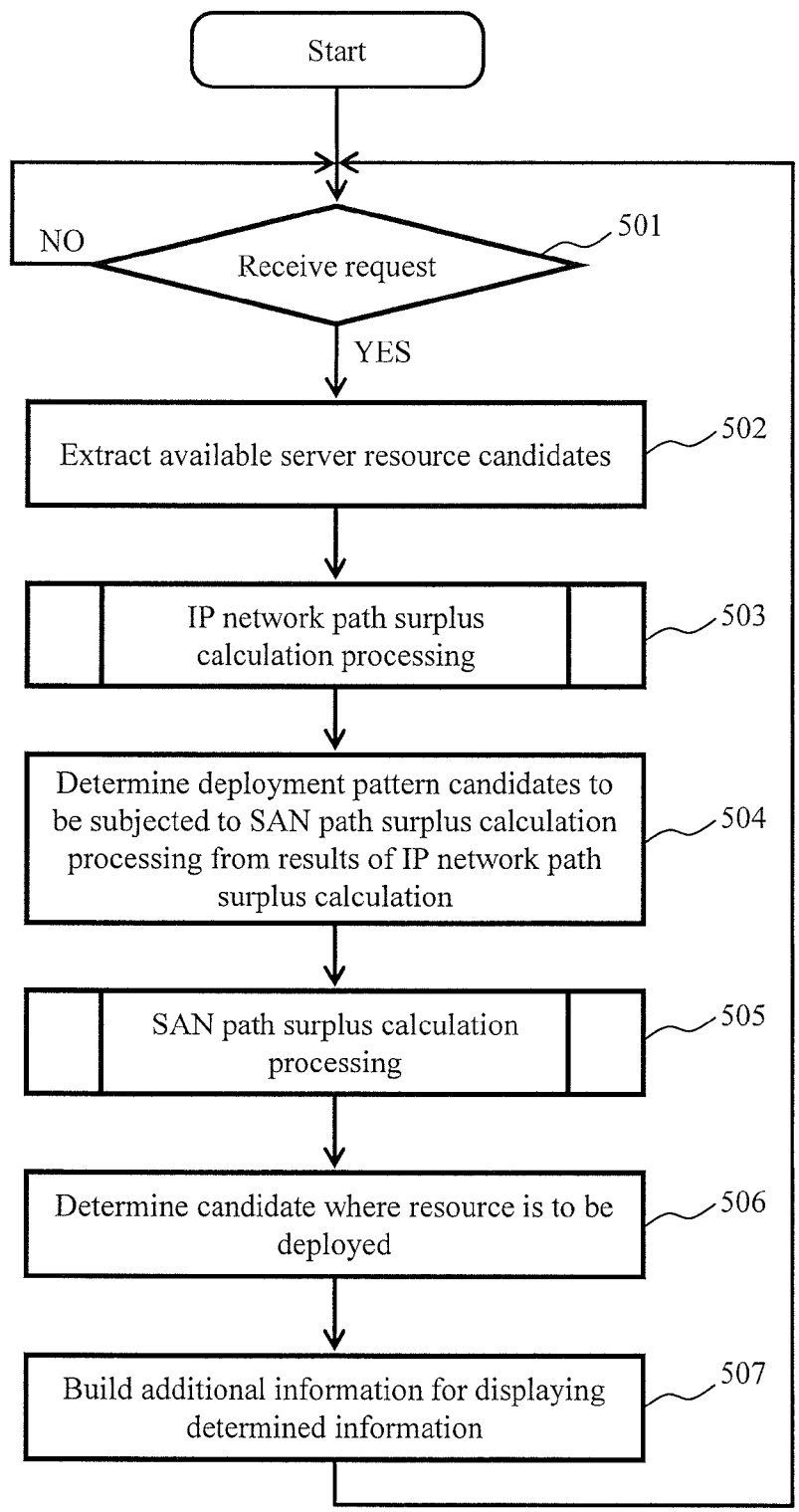

FIG. 6

| Request ID | 10001 | User ID | 1 | |
|---|---|---|---|---|
| System configuration | | | | |
| Server ID | Role | CPU | Memory | Capacity | Cluster |

| Server ID | Role | CPU | Memory | Capacity | Cluster |
|---|---|---|---|---|---|
| 001 | LB | Type A | 8G | 50G | A-1 |
| 002 | Web | Type B | 4G | 50G | A-1 |
| 003 | Web | Type B | 4G | 50G | A-1 |
| 004 | Web | Type B | 4G | 50G | A-1 |
| 005 | AP | Type A | 8G | 50G | |
| 006 | AP | Type A | 8G | 50G | |
| 007 | DB | Type C | 16G | 150G | B-1 |
| 008 | DB | Type C | 16G | 150G | B-1 |

Connecting configuration

| Segment | Server ID | List of coupled servers (IN/OUT) |
|---|---|---|
| 001 | 001 | out/002,003,004 |
| 002 | 002 | 001/005,006 |
| 002 | 003 | 001/005,006 |
| 002 | 004 | 001/005,006 |
| 003 | 005 | 002,003,004/007,008 |
| 003 | 006 | 002,003,004/007,008 |
| 003 | 007 | 005,006/ |
| 003 | 008 | 005,006/ |

Communication feature

| Predicted peak hour | 9:00-13:00/Everyday |
|---|---|
| Predicted traffic | 150Mbps |

FIG. 7

| Pattern ID | P001 | Request ID | 10001 | User ID | 1 |
|---|---|---|---|---|---|
| System configuration ||||||
| Virtual server ID | IP address | Segment ID | Physical server ID |||
| 001 | A.B.C.a | 001 | Server A |||
| 002 | A.B.D.b | 002 | Server B |||
| 003 | A.B.D.c | 002 | Server C |||
| 004 | A.B.D.d | 002 | Server D |||
| 005 | A.B.E.e | 003 | Server C |||
| 006 | A.B.E.f | 003 | Server D |||
| 007 | A.B.E.g | 003 | Server E |||
| 008 | A.B.E.h | 003 | Server F |||
| Network pattern ||||||
| PATH-P001-1, PATH-P001-2, PATH-P001-3 ||||||

FIG. 8

| NW pattern ID | PATH-P001-1 | | | | |
|---|---|---|---|---|---|
| Network information | | | | | |
| Segment ID | Segment value | VLAN ID | Rout IP address | Router | Port ID |
| 001 | A.B.C.0/24 | 10 | A.B.C.1 | IP-SW1 | 1 |
| 002 | A.B.D.0/24 | 20 | A.B.D.1 | IP-SW1 | 2 |
| 003 | A.B.E.0/24 | 30 | A.B.E.1 | IP-SW1 | 3 |
| Routing information | | | | | |
| Router ID | Destination segment | Next hop IP address | | | |
| IP-SW1 | A.B.C.0/24 | A.B.C.1 | | | |
| IP-SW1 | A.B.D.0/24 | A.B.D.1 | | | |
| | | | | | |
| IP-SW1 | A.B.E.0/24 | A.B.E.1 | | | |

FIG. 12

| Pattern ID | P001 | | |
|---|---|---|---|
| NW pattern ID | PATH-P001-1 | Adoption or rejection | 1 |
| Paths level of overlap | | | |
| Switch ID | Port ID | Number of overlaps | |
| IP-SW2 | 1 | 2 | |
| IP-SW2 | 2 | 6 | |
| IP-SW2 | 3 | 6 | |
| IP-SW2 | 4 | 4 | |

| Surplus calculation data | | | | | |
|---|---|---|---|---|---|
| Server ID1 | Server ID2 | Surplus calculation object switch | Port ID | Surplus | Surplus judgment |
| 001 | out | IP-SW1 | 1 | 200 | 0 |
| 001 | 002 | IP-SW2 | 2 | 123 | 1 |
| 001 | 003 | IP-SW2 | 4 | 300 | 0 |
| 001 | 004 | IP-SW2 | 2 | 123 | 1 |
| 002 | 001 | IP-SW2 | 2 | 123 | 1 |
| 002 | 005 | IP-SW2 | 4 | 300 | 0 |
| 002 | 006 | IP-SW2 | 4 | 300 | 0 |
| : | : | : | : | : | : |

FIG. 16

| Pattern ID | P001 | Request ID | 10001 | User ID | 1 |
|---|---|---|---|---|---|
| System configuration ||||||
| Server ID | IP address || Segment ID | Physical server ID ||
| 001 | A.B.C.a || 001 | Server A ||
| 002 | A.B.D.b || 002 | Server B ||
| 003 | A.B.D.c || 002 | Server C ||
| 004 | A.B.D.d || 002 | Server D ||
| 005 | A.B.E.e || 003 | Server C ||
| 006 | A.B.E.f || 003 | Server D ||
| 007 | A.B.E.g || 003 | Server E ||
| 008 | A.B.E.h || 003 | Server F ||
| Network pattern ||||||
| PATH-P001-1, PATH-P001-2, PATH-P001-3 ||||||
| Storage information ||||||
| Corresponding server ID | Volume ID || Storage device list |||
| 001 | WWN1 || Storage A |||
| 002 | WWN2 || Storage A, Storage B |||
| 003 | WWN3 || Storage A, Storage B |||
| : | : || : |||

SYSTEM MANAGEMENT METHOD AND SYSTEM MANAGEMENT APPARATUS

CLAIM OF PRIORITY

The present application claims priority from Japanese patent application JP 2006-116536 filed on May 20, 2010, the content of which is hereby incorporated by reference into this application.

BACKGROUND OF THE INVENTION

1. Field of the Invention

The present invention relates to a system management method and management apparatus, and more specifically to a technique for managing an operation of an Information Technology system that includes any or all of a server, a storage device, and a network.

2. Background Art

As virtualization technology has been developed, servers are consolidated in a data center in some cases, recently. As it also facilitates introduction and disposition of servers, Information Technology (IT) systems (hereinafter also referred to as "business systems" or "information processing systems") can be easily introduced. This trend is based on an intention to make the best use of the server resources. On the other hand, as the servers are consolidated, traffic between the servers is also consolidated, which may create bottlenecks in network resources before in the server resources. When a bottleneck is created in the network, the server cannot receive a request from clients or other servers, which may degrade the service quality provided by the server. This tendency is not only specific to the Internet Protocol (hereinafter referred to as IP) network but also to the Storage Area Network (hereinafter referred to as SAN). To solve the problem, the server deployment that takes account of network performance is required. This resembles the theme of routing a traffic path between two points on a network.

For example, JP Patent Publication (Kokai) No. 2005-136982A describes a method for routing a path to meet requirements by calculating unused capacity on the network in Multi-Protocol Label Switching environment in routing a path within a network. JP Patent Publication (Kokai) No. 2005-266933A describes a method for determining storage based on data traffic on the SAN.

The conventional arts disclosed in the above-mentioned JP Patent Publication (Kokai) No. 2005-136982A and JP Patent Publication (Kokai) No. 2005-266933A assume a fixed value for unused capacity on a network.

As incoming IP packets and access to storage change depending on the number of upper-layer applications and accessing clients, both the server traffic and the storage traffic do not necessarily flow by a certain amount. If a path is routed based on an average value in these circumstances, it causes a traffic bottleneck during the traffic peak hour, leading packet loss in the communication between servers (or between a server and storage). The packet loss affects the service quality on the network because it takes time in communication to resend the data. If a path is routed based on a fixed peak value, some of the network resources (or the SAN resources) left unused, which means that the network is not effectively used.

The present invention is adapted in view of the circumstances, and the object of the present invention is to provide a technique for preventing a bottleneck from occurring on a network while effectively making use of the bandwidth of the network.

SUMMARY OF THE INVENTION

In order to solve the above-mentioned problem, a system management apparatus of the present invention is a system management apparatus that builds a virtual IT system (business system), which collects performance information from network devices, calculates at least variances from the collected performance information, and in response to a request for addition or configuration of a business system, builds configuration patterns of a group of virtual servers configuring the business system and monitors traffic states of the paths on the network, and identifies the part of the network where the traffic quality is most degraded among the traffic states. Then, the system management apparatus determines the pattern with the small traffic variation by using the calculated variance to be the system configuration for the requested business system based on the traffic information on the parts which are identified as where the traffic quality is degraded in the patterns.

As another aspect, the system management apparatus may be adapted to determine the system configuration for the business system based on the traffic states in a SAN environment used by a group of virtual servers that configure the business system at first in response to a request for addition or configuration of the business system.

Features of the present invention will be apparent by reading the "Detailed Description of the Preferred Embodiment" with reference to the attached drawings.

According to the present invention, virtual servers that configure the business system can be deployed to the part of the network where the traffic is as stable as possible, which can prevent quality degradation caused by the network of the business system.

BRIEF DESCRIPTION OF THE DRAWINGS

FIG. 3 is a diagram showing an aspect of data structure for storing statistical information of the traffic of an IP network device in the first embodiment of the present invention.

FIG. 4 is a diagram showing an aspect of data structure for storing statistical information on traffic of an IP network device in the first embodiment of the present invention.

FIG. 5 is a flow chart for describing processing of a resource-providing program in the first embodiment of the present invention.

FIG. 6 is a diagram showing an aspect of a data structure of request information for building the IT system (system configuration request) from a user in the first embodiment of the present invention.

FIG. 7 is diagram showing an aspect of a data structure of IT system providing a configuration candidate which is built from a user's system configuration request in the first embodiment of the present invention.

FIG. 8 is a diagram showing an aspect of a data structure of network configuring information included in the IT system providing a configuration candidate shown in FIG. 7 in the first embodiment of the present invention.

FIG. 12 is a diagram showing an aspect of a data structure when the results of the traffic surplus calculation between the virtual servers are stored in the work memory in the first embodiment of the present invention.

FIG. 16 is a diagram showing an aspect of data structure of request information for building the IT system (system configuration request) from a user in the second embodiment of the present invention.

Figure 1:
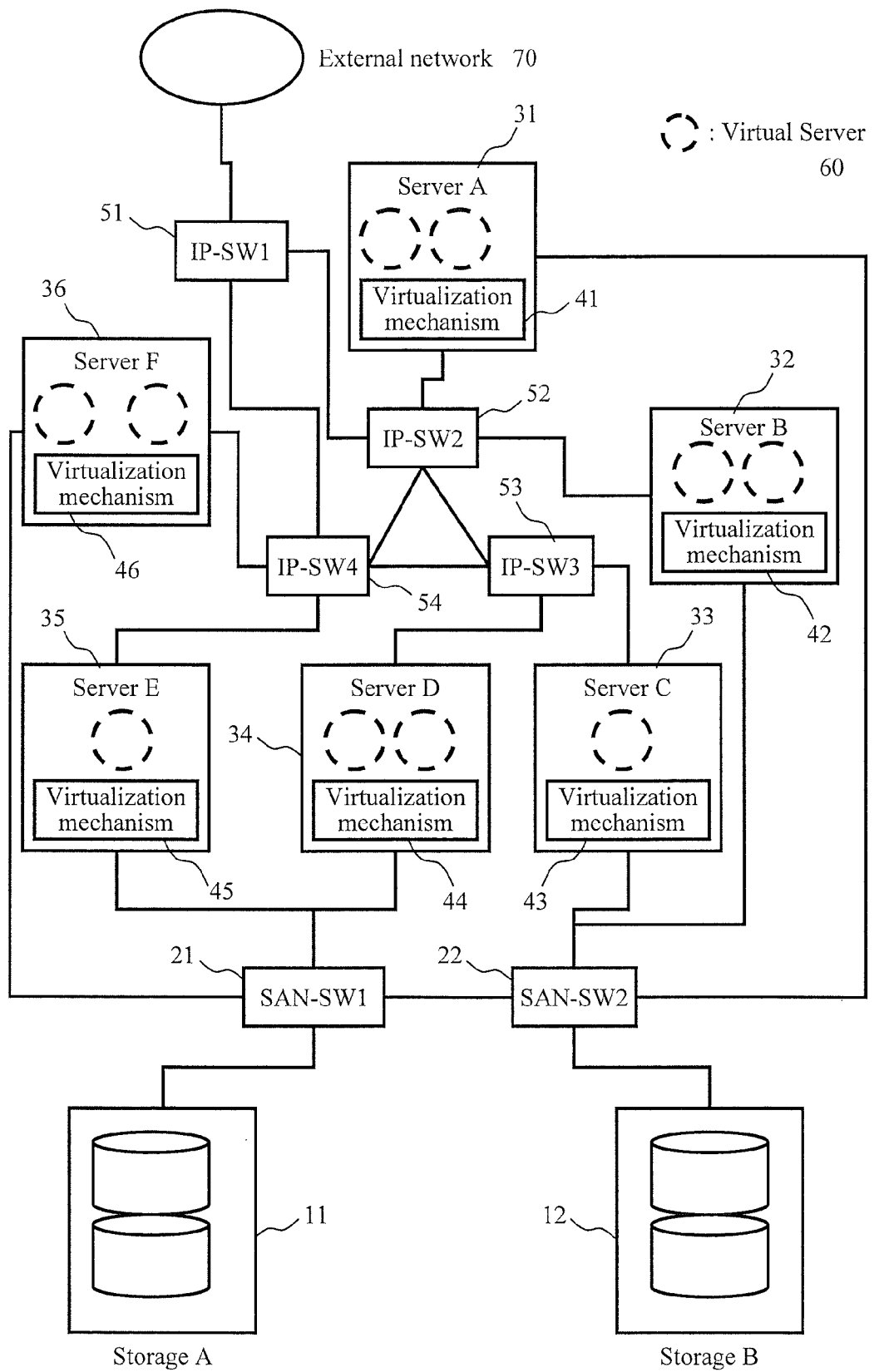
FIG. 1 is a diagram showing an example of physical arrangement of information system devices (devices to be managed) that provides an IT system in the present invention.

DESCRIPTION OF SYMBOLS 200 groups of devices to be managed
201 network for management
203 system management apparatus
210 communication control device
220 program memory
221 resource providing program
222 statistical information calculating program
223 performance information collecting program
224 configuration information collecting program
225 IP network surplus calculation processing program
226 SAN network surplus calculation processing program
230 work memory
240 CPU (Central Processing Unit)
250 databases
260 I/O controller

DETAILED DESCRIPTION OF THE PREFERRED EMBODIMENTS

Embodiments of the present invention will be described with reference to the attached drawings below. It should be noted that the embodiments shown below are merely examples of realizing the present invention and not limit the technical scope of the invention. In the figures, like components are denoted by the same reference numerals.

In this specification, information used in the present invention (including statistical information, configuration information, and performance information to be described later) may be expressed as "aaa chart," "aaa table," "aaa list," "aaa DB," "aaa queue" or table, list, DB, queue, and the like, instead of the data structure. Therefore, in order to show that the information used in the present invention does not depend on the data structure, the information may be referred to as "Information aura" even if it can be referred to as "aaa table," "aaa list," "aaa DB," or "aaa queue."

In describing the content of each form of information, the expressions "Identification information," "Identifier," "Name," "ID" are interchangeably used.

The operation of the present invention is sometimes described as what is performed by "a program" or "a module," but it may be understood as the processing performed by "a processor" because the present invention is implemented when the program or module is executed by the processor and accordingly the defined processing is performed by using the memory and communication port (communication control unit). Also, processing disclosed as performed by a program or module may be understood as the processing performed by a computer or information processor like a management server. All or part of the program may be implemented using discrete hardware components. The programs may be installed on computers from a program delivery server or through a storage medium.

(1) First Embodiment

<Configuration of the IT System to be Managed>

FIG. 1 is a diagram showing an aspect of an IT system arrangement in a data center that is to be managed by the system management apparatus of the present invention. The IT system includes a plurality of physical servers (A-F) 31-36, a plurality of storage devices (e.g., A and B) 11-12, a plurality of IP switches (IP-SW 1-4) 51-54, and a plurality of SAN switches (SAN-SW 1-2) 21-22.

The physical servers 31-36 use remote storage devices 11-12 as storage media. The physical servers 31-36 and the storage devices 11-12 are coupled with each other by the SAN switches (21-22). The physical servers 31-36 include virtualization mechanisms 41-46 respectively for building virtual servers 60 on the virtualization mechanisms. The virtual server 60 is an environment where an application for achieving a certain task is running. The applications on the virtual servers 60 exchange data with each other via the IP network. Some of the virtual servers 60 communicate with clients via an external network 70.

The data exchange between the servers is implemented via the IP switches 51-54. The IP switches 51-54 are capable of mask their communication packets from each other by virtually separating their segments. The switch 51 with a router function enables communication between the segments.

In the embodiment, each virtual server is running on a single individual physical server, but this system may be replaced by a blade system in which physical blade servers are provided in a chassis. In FIG. 1, all of the physical servers 31-36 have the virtualization mechanisms 41-46 respectively, but one or more of the physical servers without virtualization mechanism may be included. Also in FIG. 1, all of the physical servers 31-36 use the storage devices, but one or more of the physical servers may use local storage media.

<Management System>

Operation of the system management apparatus of the present invention that manages the IT system (business system) will be described below.

As the first embodiment of the present invention, a virtual server deploying method that takes account of the peak value, variance value, and average value of the network in the IT system will be described with reference to FIGS. 1 to 14.

Figure 2:
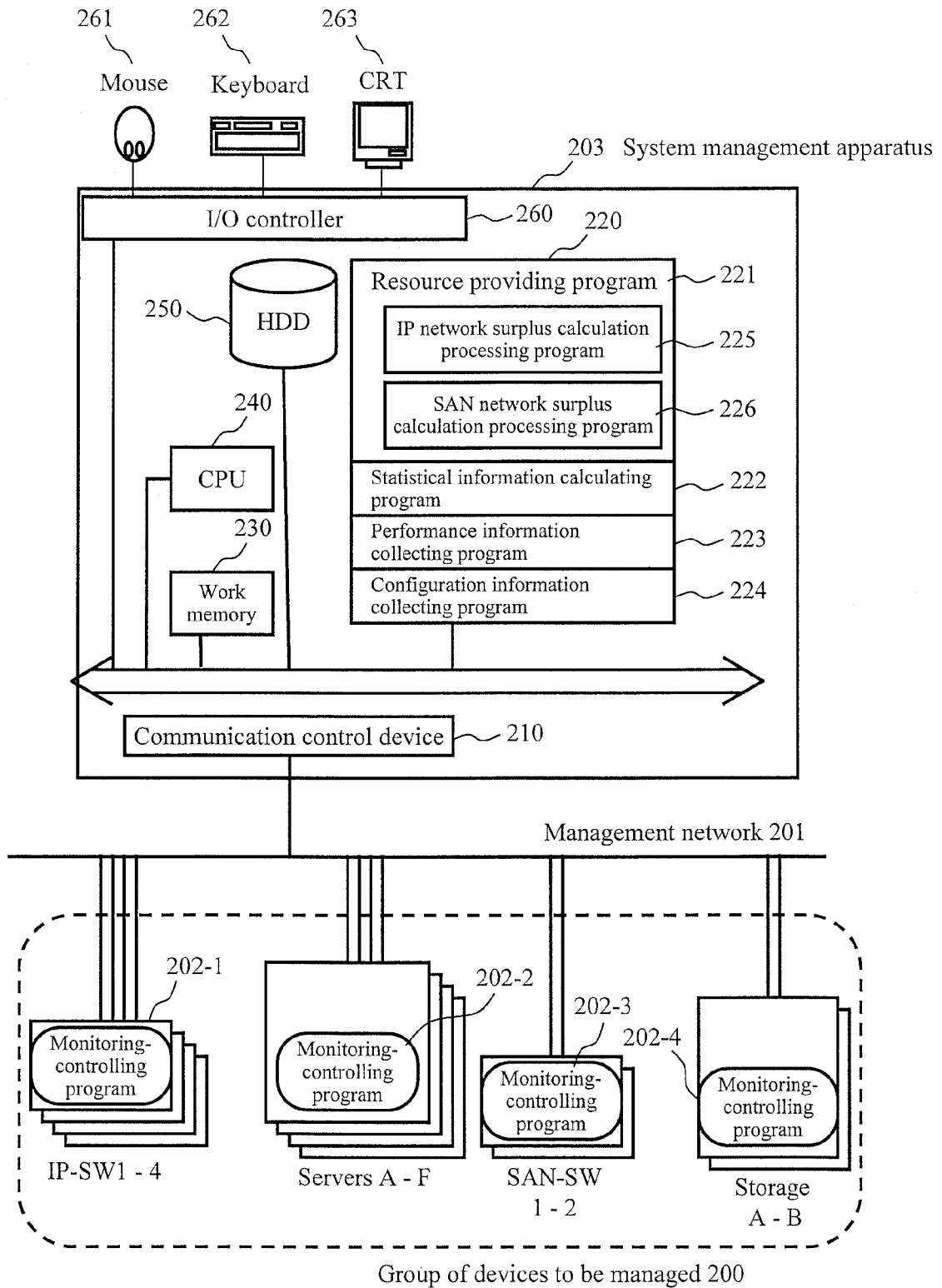
FIG. 2 is a diagram showing an example of configuration of a system management apparatus of a first embodiment of the present invention.

FIG. 2 is a diagram showing a system management apparatus 203 and a group of devices to be managed 200 according to the first embodiment. The group of devices to be managed 200 is IT resources contained in the IT system (e.g., a data center) described in FIG. 1. The objects of management respectively have monitoring-controlling programs 202-1-202-4 which provide information for the system management apparatus or control the objects in response to a request from the system management apparatus 203. Each device to be managed is coupled to a management network 201 (corresponding to the external network 70 in FIG. 1) for receiving a request from the system management apparatus 203 and sending a response thereto.

The system management apparatus 203 is for building a virtual server in accordance with a user's request. The system management apparatus 203 includes a communication control device 210 for exchanging information with the group of devices to be managed 200 via the management network 201, program memory 220 for storing program information, work memory 230 for running a program, a central processing unit (CPU) 240 for executing specific processing, a storage device (disk drive) 250 that stores a database for storing various kinds of information on the devices to be managed, an output device like a display (CRT) 263 for displaying management information such as usage of the devices to be managed, an input device like a keyboard 262 or a mouse 261 for inputting various kinds of information regarding interruption, and an input/output controller 260 for controlling the input/output devices, all of which are coupled with each other via a bus or network. The communication control device 210 is a network interface, for example, and used in sending an instruction (a user instruction) for configuring a system according to a determined connecting configuration to be described later-connecting and deployment of the physical servers and SAN-SWs for implementing a desired virtual server configuration-to the plurality of devices to be managed via the management network 201.

The program memory 220 stores a resource providing program 221 for providing resource deployment information corresponding to requirements when an administrator or a resource user inputs desired requirements for a system to build, a configuration information collecting program 224 for collecting configuration information from the device to be managed, a performance information collecting program 223 for collecting traffic information, and a statistical information calculating program 222 for calculating a variance of a traffic from the traffic information acquired by the performance information collecting program at certain time intervals. The resource providing program further includes an IP network surplus calculation processing program 225 for calculating a surplus of an IP network path between two terminals, and a SAN network surplus calculation processing program 226 for calculating a surplus of a path between the servers and the storage devices. The programs on the program memory are read in the work memory 230 as required, and the processing thereof is executed by the CPU 240.

The disk drive 250 stores configuration information on the device to be managed collected by the configuration information collecting program and acquired performance information on the respective resources collected by the performance information collecting program. It also stores statistical information on a traffic created by the statistical information calculating program.

The system management apparatus (management server, management computer) includes a display, keyboard, pointer device and the like as input/output devices as mentioned above, but it may include other devices as the input/output devices. Also, a configuration of replacing the input/output devices by a serial interface or Ethernet interface is available by connecting the interface with a display computer that has a display or a keyboard and pointer devices so that the interface can make the display computer perform input and display processing in place of the input/output devices by sending information to be displayed to the display computer and receiving information to be input from the display computer in order to display the information on the display computer and to receive input from the display computer.

In this specification, a set of one or more computers for managing the IT system and displaying the information for display are sometimes called a system management apparatus (management system). When the management server displays the information for display, the management server is the system management apparatus and also a combination of the management server and the display computer (e.g., Web browser boost server) is also the system management apparatus. A plurality of computers may implement the processing equal to that of the management server for faster and more reliable management processing, in the case of which the plurality of computers (when a display computer displays information, the display computer is included) are the system management apparatus.

<IP Network Statistical Information Table and SAN Network Statistical Information Table>

FIG. 3 is a diagram showing an aspect of an IP Network Statistical Information table 300 that stores the statistical information on the IP network device (IP-SW). The table is created for a port of each of the IP network devices (IP-SW, physical server, and the like) in the group of devices to be managed 200.

In FIG. 3, Switch 301 is an identifier for uniquely identifying the device to be managed and may be the IP address of the device to be managed. Port 302 is an identifier of the port, the performance information of which is monitored. Opposite Switch 303 is a network device to which the port is physically coupled via a cable or the like, and Opposite Port 304 is an identifier for identifying the port of the opposite switch. Statistical Data 305 is a domain for inputting statistical information for each unit time, and the field of Time indicates the first collect time during the period for collecting traffic information used in calculating each of the statistical information. Time 311 indicates the measuring time. For example, in FIG. 3, it indicates that the statistical value in the first line is calculated based on the statistical information acquired from 12 o'clock to 15 o'clock in Apr. 1, 2010. Here, this time interval is considered the unit time. Average 321, Upper Limit 313, Lower Limit 314, and Variance 315 are for inputting the average value, the biggest value, the lowest value, and variance value, respectively, based on the traffic information collected during each unit time. The method for calculating the variance value will be described later.

FIG. 4 is a diagram showing an aspect of a SAN network statistical information table 400 that stores the statistical information regarding the SAN device (SAN-SW). The contents of data are almost the same as those in the IP network statistical information table. An only difference is the unit such that Average 412, Upper Limit 413, Lower Limit 414 in the SAN Network Statistical Information table 400 are expressed by megabyte/second (MBps) whereas those in the IP Network Statistical Information table 300 are expressed by megabit/second (Mbps).

In the description below, a combination of one or more of the disk drive 250, the program memory 220, and the work memory 230 is sometimes called a storage resource. The information that has been described to be stored in the disk drive 250, program memory 220, and the work memory 230 (or the information to be described later) and the program may be considered to be stored in the storage resource.

The system configuration of the first embodiment has been described. In this embodiment, the input/output controller 260 and the input/output devices 261-263 for the administrator are placed on the system management apparatus 203, but alternatively, the programs of the embodiment are activated for the information to be input and output by having the input and output remotely logged in from other terminals. Yet alternatively, information may be input and output from a remote terminal via an Internet browser by having the user interface for providing resources provided as a web application.

<Collection Processing of Configuration Information>

From this section, operation and processing according to the first embodiment of the present invention will be described. In the description below, the expression "periodically" does not necessarily mean to perform strictly at the same time intervals. The expression "periodically" may be understood as a repetition without regard of its time interval.

In the collection processing of the configuration information, the configuration information collecting program 224 is read into the work memory 230 for periodical collection of the management information. When the program is executed, information on existing devices to be managed (also referred to as nodes to be managed) is collected from the disk drive (database) 250. In order to determine whether the objects of management are changed or not based on the acquired identifiers (e.g., IP addresses) of the objects of the management, the configuration information collecting program 224 makes a request for acquirement of the configuration information to the monitoring-controlling programs 202-1-202-4 of the devices to be managed and stores the results of the responses in the database. The method for acquiring the configuration information depends on the kinds of the devices to be managed. For example, from the network devices, the number of ports which configure the network devices, the identifiers, states, and the like of the ports are acquired as the configuration information via the SNMP (Simple Network Management Protocol). From the server devices, the host names, drive configurations, CPU performance, memory capacities, and the like are collected as the configuration information by using an interface complying with WEBM (Web-based Enterprise Management). From the storage devices, the configurations of LUs (Logical Units) and WWNs (World Wide Names) which are the identifiers of the servers which use the LUs, and the like are acquired as configuration information by using the SMI-S (Storage Management Initiative-Specification) interface. The kinds of the acquired information mentioned above are part of the configuration information and acquired as the information necessary for providing resources of the group of devices to be managed 200 including connecting relations and the like.

Next, in order to determine whether a new IP node is in the predetermined range to be managed, the configuration information collecting program 224 sends a packet to predicted IP addresses (e.g., to addresses specified within a predetermined range) and determines whether they are responded or not. If they are responded, in order to collect the configuration information on the devices to be managed, the configuration information collecting program 224 sends a request to the monitoring-controlling programs 202-1-202-4 on the devices to be managed and stores the configuration information on the new devices to be managed in the database (disk drive 250) based on the responses. In this case, the acquired configuration information may be registered by converted into the data form of the configuration information stored in the disk drive 250 (storage resource). The collection processing of configuration information by the management information collecting program has been described.

<Collection Processing of Performance Information>

Next, collection of performance information will be described. In order to periodically collect performance information, the performance information collecting program 223 is read in the work memory 230. When performance information collecting program 223 is executed, the nodes to be managed corresponding to the network devices (here, network switches, physical server devices, storage devices, SAN switches are included) are identified to the database (disk drive 250). Then, performance information collecting program 223 acquires the amounts of used bandwidths (a kind of performance information) of the ports of each node to be managed via monitoring-controlling programs 202-1-202-4. The acquired data is stored in the database in association with the acquired time for each port of the nodes to be managed. This processing is repeated at predetermined time intervals. The collection processing of performance information by the performance information collecting program 223 has been described.

<Creation Processing of Statistical Information>

Now, a calculating method of the statistical information will be described. In order to collect the performance information and to create the statistical information regularly, the statistical information calculating program 222 is read in the work memory 230. At first, when the program is executed, the IP network statistical information table 300 and the SAN network statistical information table 400 for storing the statistical information are created. By recognizing the network devices (IP-SW and server devices), and the port configuration and connecting relations thereof based on the configuration information of the devices (nodes) to be managed stored in the database (disk drive 250), the values of the corresponding switch, the port, the opposite switch, and the opposite port are configured in the tables. As the statistical information has not been created at this moment, the fields of the statistical information are left blank. This is the same for the SAN Network Statistical Information table 400.

When the statistical information tables are created, the creation processing of statistical information is regularly executed. The time interval of the processing corresponds to the unit time of creating the statistical information. When the creation processing of statistical information starts, the performance information corresponding to Switch and Port in the Statistical Information tables 300 and 400 is extracted from the performance information collected during the unit time by the performance information collecting program 223, and the average, upper limit, lower limit and variance are calculated. The upper limit and lower limit are the highest and lowest values of the amount of the used bandwidth during the unit time, and the average is derived by the formula shown below.

$$\text{Average used bandwidth: } x_{ave} = \sum_{i=1}^{n} x_i / n \qquad \text{[Expression 1]}$$

$x_{ave}$: Average used bandwidth for unit time
n: Number of measurements of the amount of used bandwidth for unit time
$x_i$: Amount of used bandwidth The variance is calculated by the formula shown below if the sample variance is adopted.

$$\text{Variance: } s = \sqrt{1/n \times \sum_{i=1}^{n} (x_{ave} - x_i)^2} \qquad \text{[Expression 2]}$$

The results of the calculations are stored in the IP Network Statistical Information table 300 for the IP switch and in the SAN Network Statistical Information table 400 for SAN switch, respectively. The statistical information calculation processing by statistical information calculating program has been described above. In the embodiment, in order to calculate the statistical information, fundamental performance information is acquired by the processing of the performance information collecting program 223 and the variance information is calculated by the statistical information calculation processing, but as another configuration, each device of the group of devices to be managed 200 may keep the performance information thereof as a function of each of the monitoring-controlling programs 202-1-202-4 for a prescribed time therein and configure the variance information based on the data. In this case, the system management apparatus 203 does not include the statistical information calculating program 222, and instead, the above-mentioned processing of acquiring the average, upper limit, lower limit, and variance is added to the performance information collecting program 223 so that the IP Network Statistical Information table 300 and the SAN Network Statistical Information table 400 can be created. As another configuration, the statistical information is calculated and then notified from the group of devices to be managed 200 to the system management apparatus 203. In this case, the performance information collecting program 223 includes the processing of waiting for receiving the statistical information from the group of devices to be managed 200 in order to acquire the statistical information and storing the received statistical information in the IP Network Statistical Information table 300 and the SAN Network Statistical Information table 400.

<Resource Providing Processing>

The resource providing processing by the resource providing program 221 will be outlined. When the system management apparatus 203 is switched on, the resource providing program 221 is read in the work memory 230 and the processing is executed by the CPU 240. First, the outline of the resource providing processing will be described with reference to FIG. 5, and the individual processing and individual kinds of information will be detailed below as required.

FIG. 5 is a flow chart for describing the outline of the processing of executing the resource providing program 221. When the resource providing program 221 is activated, it waits for a resource providing request from the administrator or a resource user (step 501). The resource providing request is made by the user or administrator for the group of servers which are built by using the IT resources, and includes requests for the specification of the server and the system configuration required by the user. When the system management apparatus 203 receives an instruction to execute the resource providing processing by the resource providing the request from the user or the like, the resource providing program 221 starts to execute the resource providing processing.

When the resource providing program 221 receives the user request included in the resource providing request (conditions for indicating the system configuration as shown in FIG. 6 and the table including this information is called the system configuration request table 600, as will be described below), it identifies the physical servers which meet the requested specifications (step 502). Here, the program acquires the configuration management information from the disk drive (database) 250 and recognizes the resource allocation for the physical servers in the group of devices to be managed 200. Then, the program acquires candidates for deployment pattern of the physical servers which can host the requested virtual servers (see FIG. 7). Here, the program can extract all the patterns in accordance with the system configuration, or otherwise, can select the configuration patterns which enable efficient use of the resources by the number N in the order of the efficiency based on the static configuration information. In either case, the locations to be deployed are decided for all the virtual servers for each candidate. An aspect of the deployment pattern table extracted by the processing is shown in FIG. 7.

Next, the resource providing program 221 executes the IP network surplus calculation processing based on Connecting Configuration 604 in the System Configuration Request table 600 by using the IP network surplus calculation processing program 225 (step 503). The processing will be detailed later with reference to FIG. 9.

Then, based on the result of the IP network surplus calculation processing (step 503), the resource providing program 221 obtains the candidates for deployment pattern which are to be candidates for the SAN path surplus calculation processing based on the results of the IP network surplus calculation processing (step 504). The specific processing will be described later with reference to FIG. 12.

Further, the resource providing program 221 executes the surplus calculation processing for the SAN network on the deployment pattern candidates (hereinafter referred to as a SAN surplus search object development pattern) obtained by the IP network path surplus processing by using the SAN network surplus calculation program 226 (step 505). The program will be detailed later with reference to FIG. 13.

Subsequently, after the surplus calculation processing for the SAN fished (step 505), the resource providing program 221 determines the candidates for the final virtual server deployment (candidates of resource deployment locations) (step 506). The processing of step 506 will also be detailed later.

Finally, the resource providing program 221 creates additional information for displaying information on the candidates determined at step 507, finishes the processing, and enters the state where the program can receive the resource providing processing execution request from the user or the like (step 507). The specific contents of the additional information creation processing will be described later.

<System Configuration Request Information>

FIG. 6 is a diagram showing the System Configuration Request table 600 that includes the information required by the resource providing request in the embodiment in the form of table. The information is notified by the administrator to the CPU 240 via the input devices 261 and 262 at step 501 in FIG. 5, and the resource providing processing is started. In FIG. 6, Request ID 601 is the number for uniquely identifying the request. User ID 602 is information for uniquely identifying the user or administrator for whom the resource is provided. System Configuration 603 corresponds to the conditions for configuring the system for providing the resource (information indicating the specification of the system configuration the user desires). Connecting Configuration 604 represents the connecting relations between the servers to be provided. Communication Feature 605 represents the requirements for the traffic of the system.

In System Configuration 603, Server ID 611 is the identifier for uniquely identifying the virtual server to be provided. Role 612 is a role of the virtual server to be provided and has various kinds like "DB," "AP," "Web," "LB," "FW," and "General." "DB" is mainly characterized by disk access like a DB server, and "AP" is a kind of server required of the processing speed as an application server. "Web," "LB," and "FW," representing a Web server, load balancer, and firewall, respectively, are the kind of server mainly required of the network performance. "General" represents a server that does not have any characteristics in particular. CPU 613 is a value of the CPU usage provided by the virtual server that is configured for each kind of predetermined pattern. Type A is information indicating the performance equal to the specification of an existing CPU (for example, a high performance CPU). Type B is information indicating the performance equal to the CPU that is of the specification different from that of Type A (CPU with the performance lower than that of Type A). Capacity 615 indicates a disk capacity required by the virtual server. Cluster 616 indicates the server device that is to be clustered in each group of servers. The servers with the same identifier are to be clustered together. That is, in FIG. 6, the Cluster fields of Server ID 007 and 008 have B-1, which means that the two servers having the entry of B-1 create a cluster together. The Cluster 616 fields of Server ID 001-004 have A-1. This cluster configuration A-1 means that a plurality of servers are configured to cooperate with each other in performing predetermined processing for the purpose of improving the performance and availability. That is to say, a cluster created for the purpose of improving the performance is such that predetermined processing is divided to make a plurality of servers execute each fragment in parallel so that the run time of the predetermined processing is shortened or that predetermined processing is executed by a plurality of servers in parallel so that the number of times the predetermined processing is executed during the unit time is increased. A cluster created for the purpose of improving the availability is used in taking over predetermined processing in the cases where the predetermined processing cannot be executed due to fault or the like of a server, or where the processing speed is lowered.

In Connecting Configuration 604, Segment 621 represents a network segment in which the provided server(s) are deployed, where the servers of the same number are in the same segment. Server ID 622 is the identifier for identifying the server to be provided and is allocated the identifier same as that in Server ID of System configuration. List of Coupled Servers 623 is a list of Server IDs of a group of servers to communicate with the corresponding server. Here, "out" represents the existence of the communication from outside, i.e., access from the external network 70.

In Communication Feature 605, Predicted Peak Hour 631 indicates the time period when the traffic will become high in the system to build. Predicted Traffic 632 represents the estimate of the traffic flow that will start in the system to build. In FIG. 6, it is indicated that the traffic on average of 150 Mbps will flow in the system.

In this table, Communication Feature is given as estimates for the whole system, but it may be inserted in the Connecting Configuration 604 as estimates of the traffic for each connecting configuration.

<Deployment Pattern Table>

FIG. 7 is diagram showing an aspect of deployment pattern table indicating candidates of deployment pattern for the physical servers obtained at step 502 (configuration candidate pattern indicating the connecting configuration candidates). The information is obtained by executing step 502 shown in FIG. 5.

Deployment Pattern table 700 includes Pattern ID 701 for uniquely identifying the deployment pattern, Request ID 702 for uniquely identifying a request that provided the basis for building the deployment pattern, User ID 703 for uniquely identifying the user who made the request, System Configuration 704 that includes information for actually deploying the virtual servers according to the deployment pattern, and Network Pattern 705 for containing reference information on the table that includes configuration information on the network predicted for System Configuration 704 (e.g., information on the switch (router) by which the segments are coupled with each other) as the configuration items.

System Configuration 704 includes Virtual Server ID 711 for uniquely identifying the virtual server, IP Address 712 of the virtual server, Segment ID 713 for uniquely identifying the network segment (hereinafter sometimes referred to as "segment") to which the virtual server belongs, and Physical Server ID 714 for uniquely identifying the physical server in which the virtual server is to be deployed. Here, the entry of Virtual Server ID 711 is the same as that of Server ID 611 in the System Configuration Request table 600. Physical Server ID 714 is an identifier of the physical server which hosts the virtual server, and based on the identifier, the configuration information on the physical server can be acquired from the disk drive (database) 250.

Information in the Deployment Pattern table 700, i.e., deployment candidates for the physical servers are determined based on the configuration information of the System Configuration 603 and Physical Server (A-F) 31-36 (e.g., information like the server(s) which are included in the group of physical servers with Type A CPU, the server(s) which have the required memory capacity).

<Network Pattern Table>

FIG. 8 is a diagram showing an aspect of Network Pattern table 800 representing the configuration information of Network Pattern 705 in Deployment Pattern table 700.

Network Pattern table 800 includes NW Pattern ID 801 for uniquely identifying the network configuration, Network Information 802 for including the segment information of the network, and Routing Information 803 that is the information regarding the routing between the networks as the configuration items.

Network Information 802, indicating the information on the segments, is created for each network segment, and includes Segment ID 811 for uniquely identifying the segment, Segment Value 812 that represents network segment, VLAN ID 813 that represents the VLAN number when the segment is a VLAN, Route IP Address 814 that represents the IP address of the segment from which a packet is transferred to another segment, Router device 815 for uniquely identifying the switch device corresponding to the IP address, and Port ID 816 that represents the corresponding port number of the device as the configuration items.

Routing Information 803 is the information for configuring the routing information to be added, and includes Router Device ID 821 for uniquely identifying the switch for routing, Destination Segment 822 that represents the destination network segment, Next Hop IP Address 823 that represents the destination IP address of the next hop switch to which a packet is to be sent in order to transfer the packet as the configuration items. When existing routing information is used, Routing Information 803 does not exist.

Network Pattern table 800 is referenced from Network Pattern 705 of Deployment Pattern table 700. Although only the information on transfer of the packet is configured as Routing Information 803 in the embodiment, the network segment of the source may also be specified from the viewpoint of the security. In the latter case, it is configured on the network devices that only the specific network segment of the source can transfer the packet to the specified destination segment.

<Details of IP Network Path Surplus Calculation Processing (Step 503)>

Figure 9:
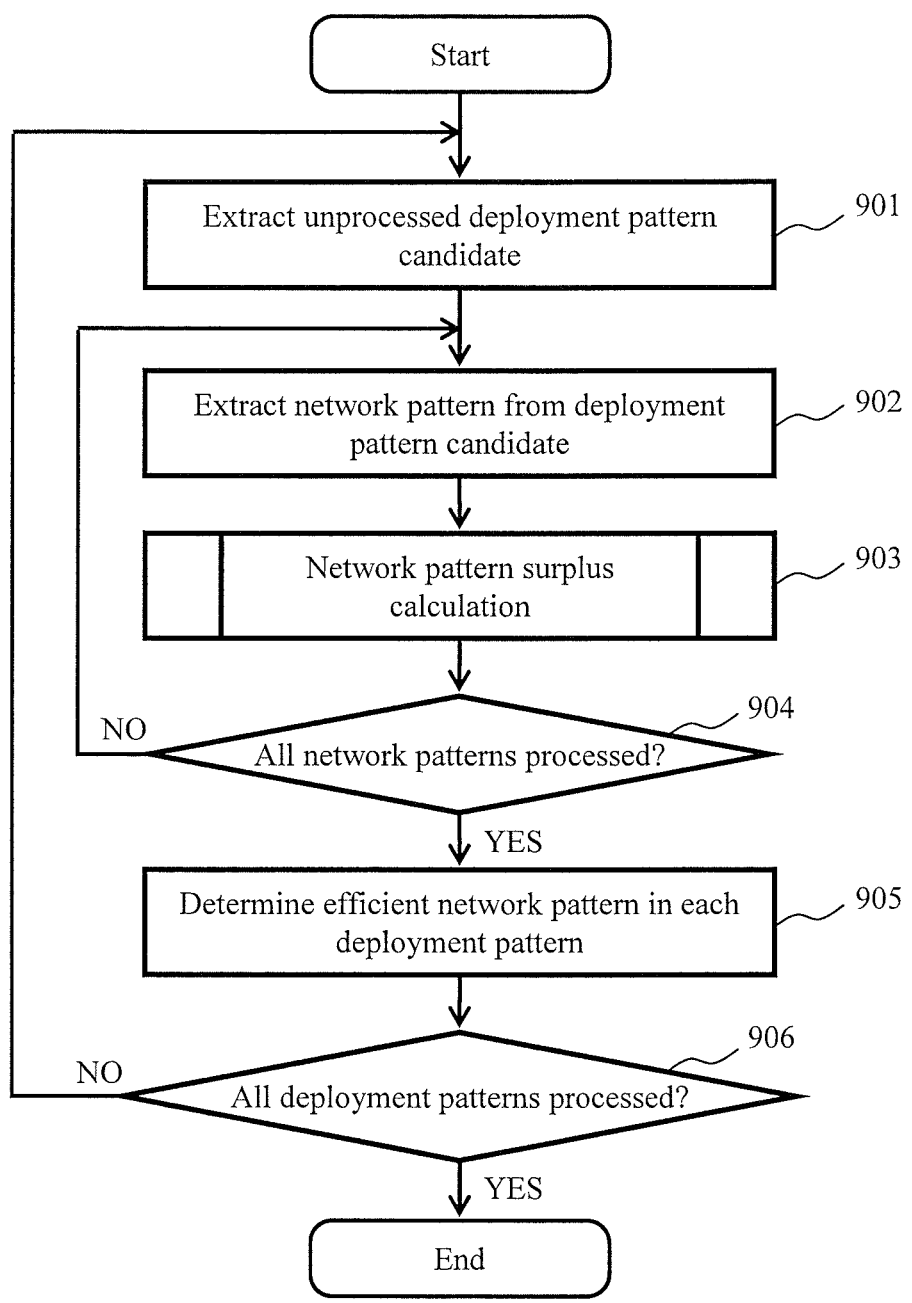
FIG. 9 is a flow chart for describing IP network path surplus calculation processing by a resource-providing program in detail in the first embodiment of the present invention.

FIG. 9 is a flow chart for describing the details of IP network path surplus calculation processing (step 503) shown in FIG. 5.

In the IP network path surplus calculation processing, the IP network surplus calculation processing program 225 first extracts a deployment pattern 700 from a list of candidates obtained by the extraction processing on the resource candidates (step 502) (There are a plurality of Deployment Pattern 700 shown in FIG. 7) (step 901).

Next, IP network surplus calculation processing program 225 takes a network pattern 705 from the extracted deployment pattern and decides the system configuration to be assumed (step 902).

After deciding the system configuration to be assumed, IP network surplus calculation processing program 225 executes the network pattern surplus calculation processing (step 903). The details of the processing in step 903 will be described later with reference to FIG. 10.

After the network pattern surplus calculation processing is complete, IP network surplus calculation processing program 225 determines whether all the network patterns are processed or not (step 904).

If all the patterns are processed, IP network surplus calculation processing program 225 identifies the most efficient network pattern in the deployment pattern (step 905). As the specific identifying method is based on the same concept of part of the network pattern surplus calculation processing, it will be described after the description of FIG. 10.

When the efficient network patterns are identified for all the deployment patterns, the processing ends (step 906). Accordingly, the number of the network patterns used for all the deployment patterns, and the number of the surplus bandwidths and critical surplus bandwidths of all the deployment patterns can be recognized.

<Details of Network Pattern Surplus Calculation Processing (Step 903)>

Figure 10:
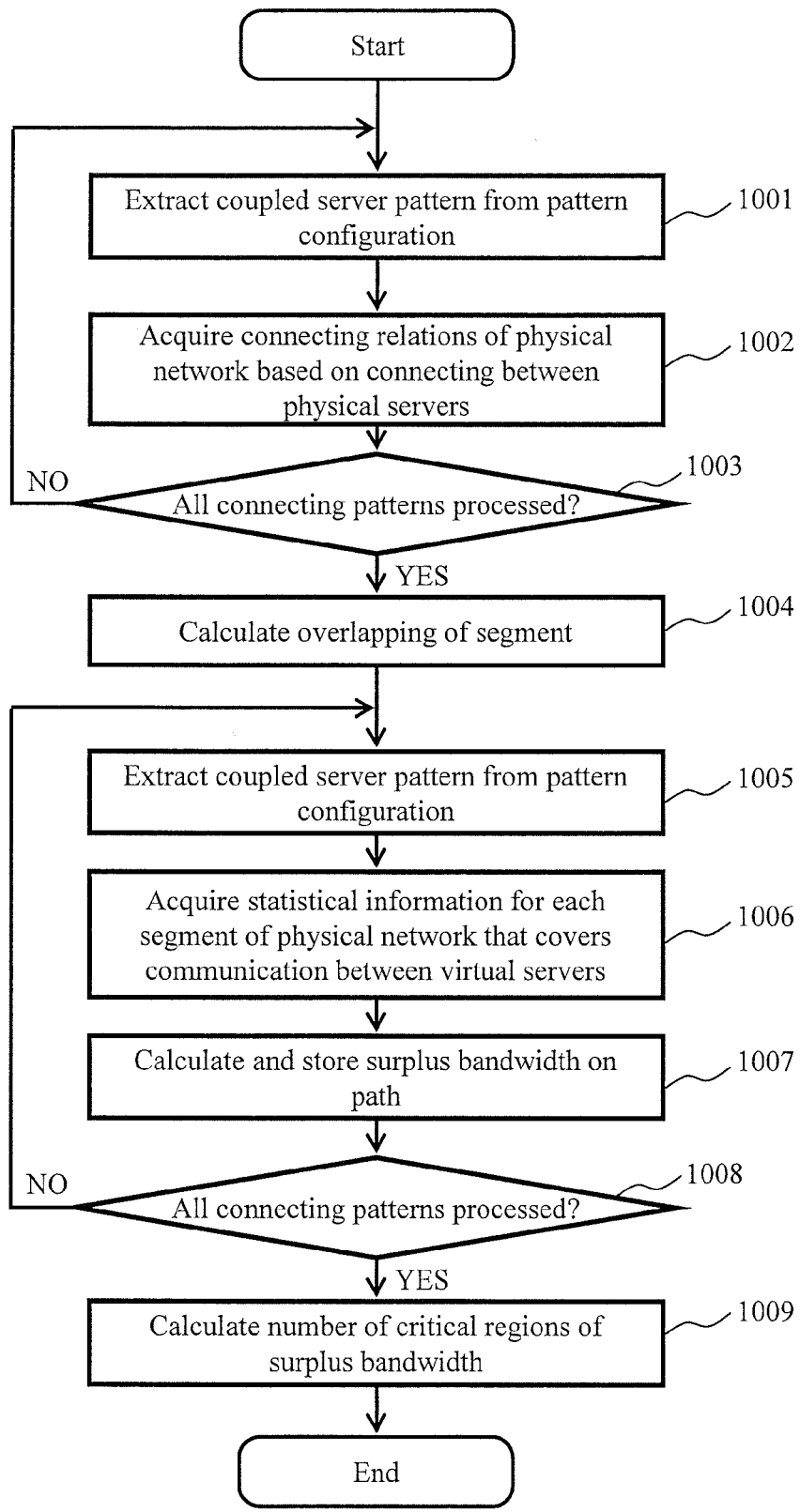
FIG. 10 is a flow chart for describing processing of calculating the surplus state on a network pattern in detail in the IP network path surplus calculation processing in the first embodiment of the present invention.

FIG. 10 is a flow chart for describing the details of Network Pattern Surplus Calculation Processing (step 903).

First, IP network surplus calculation processing program 225 takes a piece of data (a combination of Segment 621-Server ID 622-List of Coupled Servers 623) from the connecting configuration 604 in the System Configuration Request table 600 and determines the terminal points of the configuration between the servers to be searched (step 1001). For example, the terminal points are according to the relations between Server ID 622 and a server of the List of Coupled Servers 623 in FIG. 6, one of the combinations like Server ID 001 and Server ID out, Server ID 001 and Server ID 002, and the like.

Figure 11:
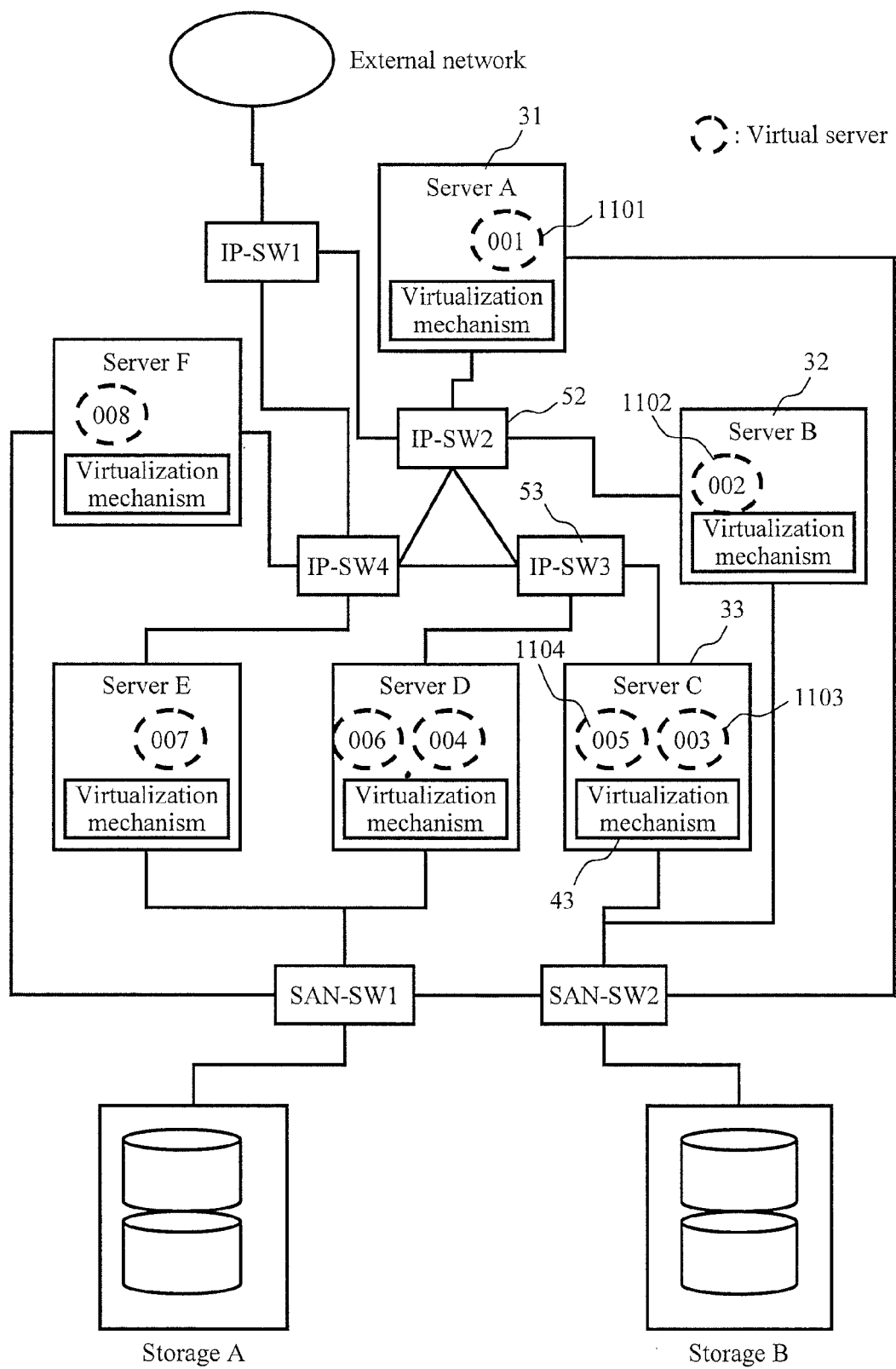
FIG. 11 is a diagram showing a system configuration when virtual servers are actually deployed in the first embodiment of the present invention.

Next, the IP network surplus calculation processing program 225 identifies the physical servers which host the virtual servers which are coupled with each other, according to Virtual Server ID 711 and Physical server ID 714 in the Deployment Pattern table 700 based on Server ID at the terminal points between the servers to be searched. Then, the program identifies physical path information used between two virtual servers based on the configuration information on the physical servers and network that is stored in the disk drive (database) 250 (step 1002). This is the processing for obtaining the VLAN traffic path when the IP addresses are in the same segment. It is assumed here that physical connecting relations between the switches are known by using LLDP (Link Layer Discovery Protocol) for the VLAN paths. Under that circumstances, as the STP (Spanning Tree Protocol) blocking port that is used when there is a loop is known, the paths between the VLAN switches can also be known. When the traffic is to pass through a plurality of routers, the path is determined based on Routing Information 803 specified in the Deployment Pattern table. When there is not routing information, the routing information that has been configured in the switches is collected from the disk drive (database) 250, and based on the information, the routing path is determined. Specific concept of the path identification will be briefly described with reference to FIG. 11. FIG. 11 is a diagram showing an example of an IT system (business system) that represents a deployment pattern in the arrangement of the devices to be managed shown in FIG. 1. Here, when the virtual server 001_1101 in the physical server A31 communicates with the virtual server 002_1102 in the physical server B32, the traffic only passes through IS-SW2_52, but when it communicates with the virtual server 003_1103, the traffic passes through IP-SW2_52 and IP-SW2_53. In contrast, when the virtual server 003_1103 and the virtual server 005_1104 on the physical server C33 communicate with each other, the traffic only passes through the internal virtual switch installed in the virtual mechanism 43 of the physical server C.

As mentioned above, IP network path surplus calculation processing program 225 obtains physical path information against the connecting configuration of all the deployment patterns (step 1003), and based on the obtained group of physical path information, further obtains overlapping among the paths of the deployment pattern, and make the number of overlapped paths the level of overlap (step 1004). The level of overlap can be obtained by matching the plurality of paths between the servers and examining the number of overlaps for each path. The level of overlap, which is not currently used, is an index of traffic congestion in future when an additional IT system (business system) will be installed.

The level of overlap can be calculated in accordance with the role of the server. For example, when the role of the server is "LB," which is merely allocating the transactions, the server distributes the input traffic. Accordingly, for the connection to the server, the role of which is "LB," the level of overlap is divided by the number of the servers to which "LB" is connected. Thereafter, the level of overlap may be calculated on the basis of the above-mentioned value. Specifically, with reference to the exemplary configuration in FIG. 6, the server of ID 001 has the role of "LB." As the server 001 is connected to the servers 002-004, the level of overlap between the server 001 and the server 002, the server 001 and the server 003, and the server 001 and the server 004 is ⅓=0.33, which may be the basis for configuring the level of path overlap. Similarly, in the case of cluster configuration, as there is an active traffic in the hot standby configuration, the level of overlap may be determined 1 for one path and 0 for another path.

Subsequent to the calculation of the level of overlap, the IP network surplus calculation processing program 225 judges the surplus of the communication path between the virtual servers. First, the program extracts one of the physical path information between the servers that has been derived by the above-mentioned processing (step 1005). For example, the program extracts one of the paths (the information obtained in step 1002) between the servers which are identified with Server ID 1 and Server ID 2 in FIG. 12 to be described later.

Then, the IP network surplus calculation processing program 225 acquires the bandwidth between the segments which support the communication between the servers from the configuration information and the average variance of the traffic by predetermined unit from the database (step 1006).

At the same time, the IP network surplus calculation processing program 225 calculates the available transfer bandwidth from the segment bandwidth and the average of the traffic usage (step 1007). The information on switches and ports obtained by the processing in step 1007 is entered in the fields of Surplus Calculation Object Switch 1223 and Port ID 1224 in the Calculation Results Storing Area 1200 (see FIG.

12) in the work memory 230 to be described later, and the calculated available bandwidths are entered in the field of Surplus 1225.

The method of calculating the available transfer bandwidth executed in step 1007 is like this: At first, when there is Predicted Peak Hour under Communication Feature in the request information, the data with the smallest available bandwidth during the unit time (for example, a time period for calculating the statistical data at certain intervals) among the acquired statistical data is taken as the object data. Here, the available bandwidth is calculated on the basis of the above-mentioned level of overlap. For example, a difference between the average value of the statistical data and the transfer bandwidth of the corresponding port is calculated and the difference is divided by the above-mentioned level of overlap to give the available bandwidth. The peak information and the variance information are acquired for the segment between the network devices supported by the physical path. Here, the available bandwidths are categorized. For example, when the available bandwidths are 100 Mbps, 120 Mbps, 130 Mbps, and 500 Mbps and they are categorized by 50 Mbps, the available bandwidths within the range of 100 Mbps-150 Mbps will be in the same category. Accordingly, the lowest bandwidth in the category is 100 Mbps and the objects of judgment using variance are the three bandwidths of 100 Mbps, 120 Mbps, and 130 Mbps which are included in the same category. The bandwidth with the biggest variance among the three bandwidths will be the bottleneck on the path. Although this specific example is described about the processing of grouping the bandwidths by the unit of 50 Mbps, it may be adapted to allow the threshold of the category to be preset in the system management apparatus as a parameter or to allow the user to input the category to group the available bandwidths in the category list.

Then, the IP network surplus calculation processing program 225 generates the conditions for all patterns (step 1008), and when all combinations of the virtual servers are processed, the program judges the bandwidth with the smallest surplus value to be the critical surplus bandwidth based on the predicted traffic in the request information, and enters the judgment in the field of Surplus Judgment 1226 in the Calculation Results Storing Area 1200 (FIG. 12) in the work memory 230 to be described later.

<Network Pattern Surplus Calculation Result>

FIG. 12 is a diagram showing an aspect of Calculation Results Storing Area 1200 created in the work memory 230 to be used in the network pattern surplus calculation processing in FIG. 10. A plurality of the table shown in FIG. 12 is created for each combination of Pattern ID and NW Pattern ID by the processing shown in FIG. 10 so that the most efficient pattern is determined.

The data in the work memory 230 includes Pattern ID 1201 for enabling the corresponding deployment pattern to be associated with, NW Pattern ID 1202 for associating the specified network pattern, Adoption or Rejection 1203 for entering information for judging whether the network pattern is to be used as the deployment pattern, Path Level of Overlap 1204 for entering the level of overlap of the switch used in the network pattern, and Surplus Calculation Data 1205 for entering the judgment of the surplus (the result obtained in step 1007).

Path Level of Overlap 1204 includes Switch ID 1211 for identifying the corresponding switch, Port ID 1212 for identifying the port, and Number of Overlaps 1213 for entering the calculation result (the result in step 1004), i.e., the number of overlaps as the configuration items.

Surplus Calculation Data 1205 includes Server ID 1_1221 for identifying the server that originates the path at the terminal point of the path, Server ID 2_1222 for identifying the server at the endpoint of the path, Surplus Calculation Object Switch 1223 for identifying the switch that will be the basis of determination of the corresponding switch, Port ID 1224 for identifying the port of the corresponding switch, Surplus 1225 for entering the calculated available bandwidth, and Surplus Judgment 1226 for entering the judgment that the surplus is in the critical range as the configuration items. The information for Surplus 1225 and Surplus Judgment 1226 is not entered in the processing up to step 1004, and entered after steps 1007 and 1009 are executed.

<Method of Identifying Efficient Network Pattern (Specific Processing in Step 905)>

The specific processing in step 905 will be described. As mentioned above, in step 905, the most efficient network pattern in the deployment pattern is identified. In the identification of the network pattern, categorization is used as in the processing in step 1007. That is, when the smallest Surplus 1225 is, for example, 75 Mbps, 80 Mbps, 123 Mbps, 120 Mbps, 130 Mbps, and 135 Mbps in respective network patterns, and they are categorized by 50 Mbps, the surplus within the range of 50 Mbps-100 Mbps and the surplus within the range of 101 Mbps-150 Mbps will belong to the same categories respectively.

The processing in step 905 is the opposite of the processing in step 1007. That is, the category with the biggest surplus includes the efficient pattern candidate among a plurality of categories. As 135 Mbps is the biggest surplus among the plurality of categories in the above-mentioned example (where entries for Surplus 1225 are 75 Mbps, 80 Mbps, 123 Mbps, 120 Mbps, 130 Mbps, and 135 Mbps), the objects of judgment are all of 123 Mbps, 120 Mbps, 130 Mbps, and 135 Mbps included in the category 101-150 Mbps. The surplus with the smallest variance of the extracted search objects among the four entries has the smallest traffic variation at present, therefore, is decided as the network pattern that can most efficiently use the network.

According to the judgment, even the part of the pattern that has the least variation and most likely to become a bottleneck is judged that it can stably transfer the traffic because it has a small variance. For the traffic pattern adopted here, the value in Adoption or Rejection area 1203 in the Calculation Results Storing Area 1200 (FIG. 12) stored in the work memory 230 is changed from 0 to 1. Accordingly, a network pattern (corresponding to 800 in FIG. 8) in Network Pattern 705 of Deployment Pattern 700 is decided as the network pattern of the deployment pattern.

<Details of Determination of Deployment Pattern Candidates to be Subjected to SAN Path Surplus Calculation Processing (Step 504)>

Here, the specific processing of the determination (step 504 in FIG. 5) of deployment pattern candidates (SAN surplus search deployment pattern candidates) that is to be subjected to SAN path surplus calculation processing from the result of IP network path surplus calculation processing will be described.

In this step, among the network configurations adopted by the respective deployment patterns, those having the same values in the corresponding Pattern ID 1201 and NW Pattern ID 1202 in the Calculation Results Storing Area 1200 (see FIG. 12) stored in the work memory 230 and also having 1 for the value in Adoption or Rejection 1203 are the objects of the processing. Among the configurations which match the conditions, the configurations which are determined to have a small surplus obtained by the IP network surplus calculation processing (step 503, FIGS. 9 and 10) are selected as deployment pattern candidates to be subjected to the SAN path surplus calculation processing (step 505). Here, all the deployment patterns may be made the candidates for the SAN path surplus calculation processing, or the patterns the surplus of which are determined small as mentioned above may be made the candidates for the SAN path surplus calculation processing by a number from the smallest surplus. If the patterns are not determined for surplus or some patterns are determined to have the same surplus, the surplus of the smallest value in Surplus 1225 of Surplus Calculation Data 1205 in Calculation Results Storing Area 1200 for the network pattern to be adopted in the corresponding deployment pattern, i.e., in the corresponding Network Pattern 705 created in the memory 230 is taken as the representative surplus. Then, the associated Surplus Calculation Object Switch 1223 and Port ID 1224 are identified by using the corresponding surplus calculation data. According to the identified information, Statistical Information 300 is collected from the disk drive 250 (database). From the statistical information, variances in the statistical data corresponding to the peak hour that matches the request are extracted. Then, the deployment patterns that have the smaller values among those of the extracted variances of the search object are determined as the patterns which more stably provide the network. According to the determination, the deployment patterns are placed in order for the IP network stability provided by the patterns with the same surplus judgment. In the above-mentioned manner, the deployment patterns with the small number of the same surplus judgments have been placed in order.

Here, all the deployment patterns may be made the SAN path surplus calculation processing candidates. Otherwise, the surplus of the smallest value in Surplus 1225 of Surplus Calculation Data 1205 in Calculation Results Storing Area 1200 for the network pattern to be adopted in the corresponding deployment pattern, i.e., for the corresponding Network Pattern 705 created in the memory 230 is taken as the representative surplus. Then, the associated Surplus Calculation Object Switch 1223 and Port ID 1224 are identified by using the corresponding surplus calculation data. According to the identified information, Statistical Information 300 is collected from the disk drive 250 (database). From the statistical information, variances in the statistical data corresponding to the peak hour that matches the request are extracted. Then, the deployment patterns that have the smaller values among those of the extracted variances of the search objects may be determined as the patterns which more stably provide the network, and sorted accordingly so that the deployment patterns by a number from the biggest surplus are made the candidates for the SAN path calculation processing. As another approach, the deployment patterns may be sorted according to the order from the smallest value in Surplus Judgment 1226. If the deployment patterns have the same surplus judgment, all the deployment patterns are sorted according to the standard based on Surplus 1225 and a number of patterns from the top are made the SAN path surplus calculation processing candidates.

<Details of SAN Network Surplus Calculation Processing (Step 505)>

Figure 13:
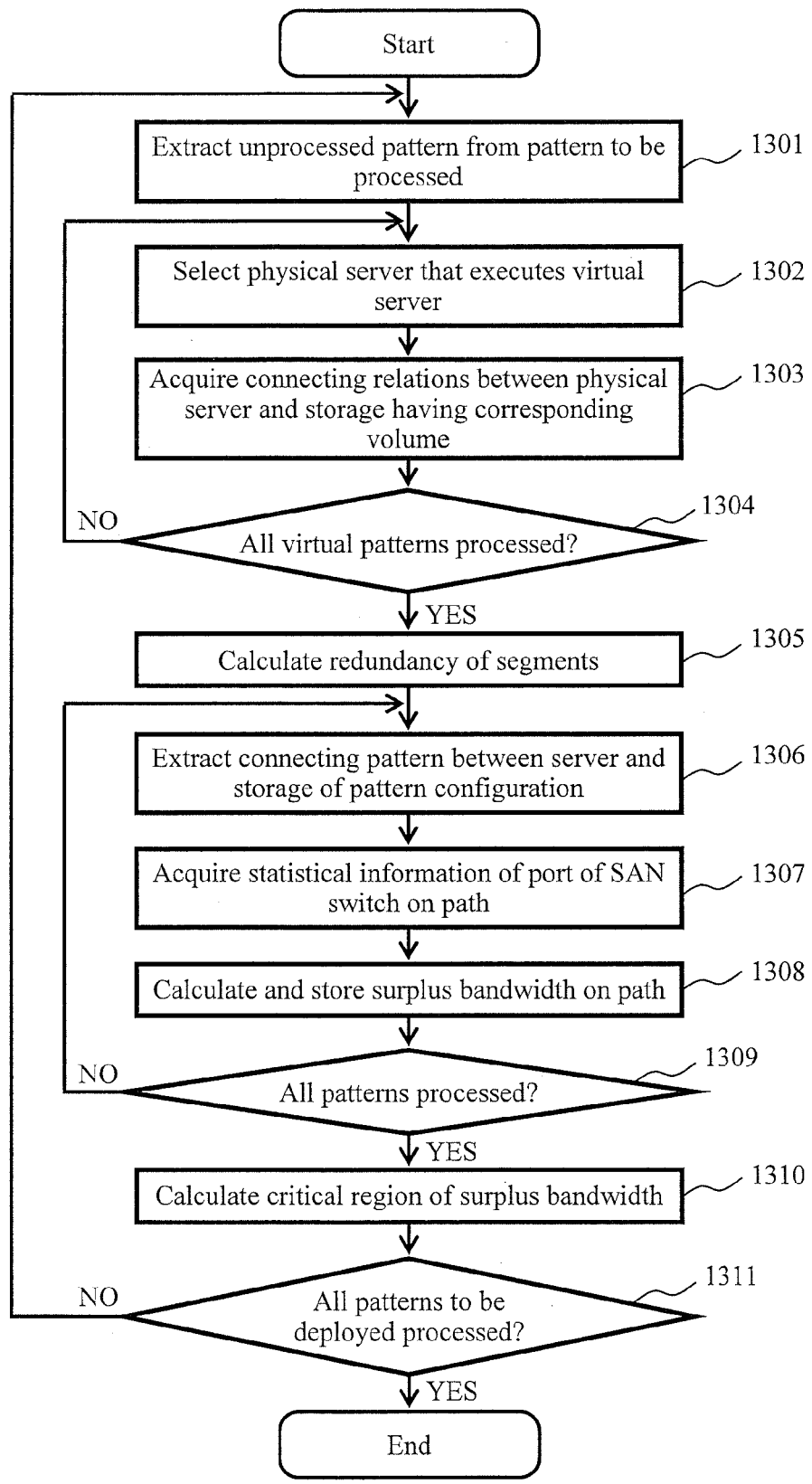
FIG. 13 is a flow chart for describing processing of surplus calculation on the SAN environment in detail in the first embodiment of the present invention.

FIG. 13 is a flow chart for describing the details of the SAN network surplus calculation processing (step 505).

First, the SAN network surplus calculation processing program 226 extracts an unprocessed pattern from the SAN surplus search deployment patterns (step 1301).

Further, the SAN network surplus calculation processing program 226 extracts an element of the system configuration in the configuration pattern extracted in step 1301 (step 1302). This corresponds to a line in 704 shown in FIG. 7.

Then, the SAN network surplus calculation processing program 226 identifies the physical server associated with the virtual server in the element extracted in step 1302 according to the correspondence between Physical Server ID (the value in 714) and Server ID (the value in 711) that corresponds to the virtual server. Also, according to the configuration information in the database, the program identifies the storage the physical server is using, acquires the group of SAN switches that is used when the corresponding server and the storage device communicates with each other and the port of the corresponding SAN switch from the configuration information in the database, and makes them the connecting information on the correspondence between the physical server and the storage (step 1303). Hereinafter, the connecting information will be referred to as "server storage connecting-related information."

Next, the SAN network surplus calculation processing program 226 repeats the processing in steps 1302 and 1303 on all the system configurations of the corresponding deployment pattern (step 1304). Further, the SAN network surplus calculation processing program 226 searches for an overlap of the paths from the SAN switches used in the deployment pattern (step 1305).

Then, the SAN network surplus calculation processing program 226 extracts a set of server storage connecting-related information created in step 1303 (step 1306), and acquires the statistical information on the ports of the SAN switch that is included in the connecting-related information from the disk drive (database) 250 (step 1307).

The SAN network surplus calculation processing program 226 calculates the surplus bandwidth from the acquired statistical information according to the standard the same as that used in the case of IP network and stores the bandwidth in the work memory 230 (step 1308).

The SAN network surplus calculation processing program 226 repeats the processing in steps 1306 to 1308 on all the connecting patterns (step 1309), and when all the patterns have been processed, calculates the critical region for the surplus bandwidth (step 1310). Here, the critical region is calculated in this manner. Based on the threshold preset by the administrator who uses the system management apparatus, if the surplus bandwidth is below the threshold, the path is judged the critical region so as not to use the path. For example, when the threshold is set to 5%, the standard for judging the path having the bandwidth of 2 GB the critical region is 50 MBps or below.

Then, the SAN network surplus calculation processing program 226 executes the above-mentioned processing (steps 1301-1310) on all the SAN surplus search deployment patterns (step 1311).

The surpluses of the bandwidths have been obtained for the traffics in the SAN network.

<Resource Deployment Location Candidate Decision Processing (Step 506)>

The above-mentioned processing for deciding the final deployment of virtual servers (step 506) will be specifically described.

In the processing for deciding the candidates, if there is one of the surplus judgments obtained in the SAN network surplus calculation processing, the virtual server is deleted from the candidates because it cannot be deployed from the viewpoint of storage. If the surpluses of all the deployment patterns do not exceed the predicted bandwidth, the order of the SAN surplus deployment patterns created in step 504 is decided as the final order.

<Additional Information Creation Processing (Step 507)>

Here, the details of the processing for creating the additional information for displaying the judgment obtained in step 506 to the administrator or the end user (step 507) will be described.

In the processing, first, the predicted traffic after the deployment is calculated based on the calculation result obtained in step 506. This is the processing for determining the amounts of the respective segments to be increased based on the predicted traffic of Request ID on the deployment pattern of the final result. Here, the increasing rate of the traffic is calculated based on the level of overlap calculated in the Calculation Results Storing Area 1200, and System Configuration 603 and Predicted Traffic 632 in the System Configuration Request table 600.

Figure 14:
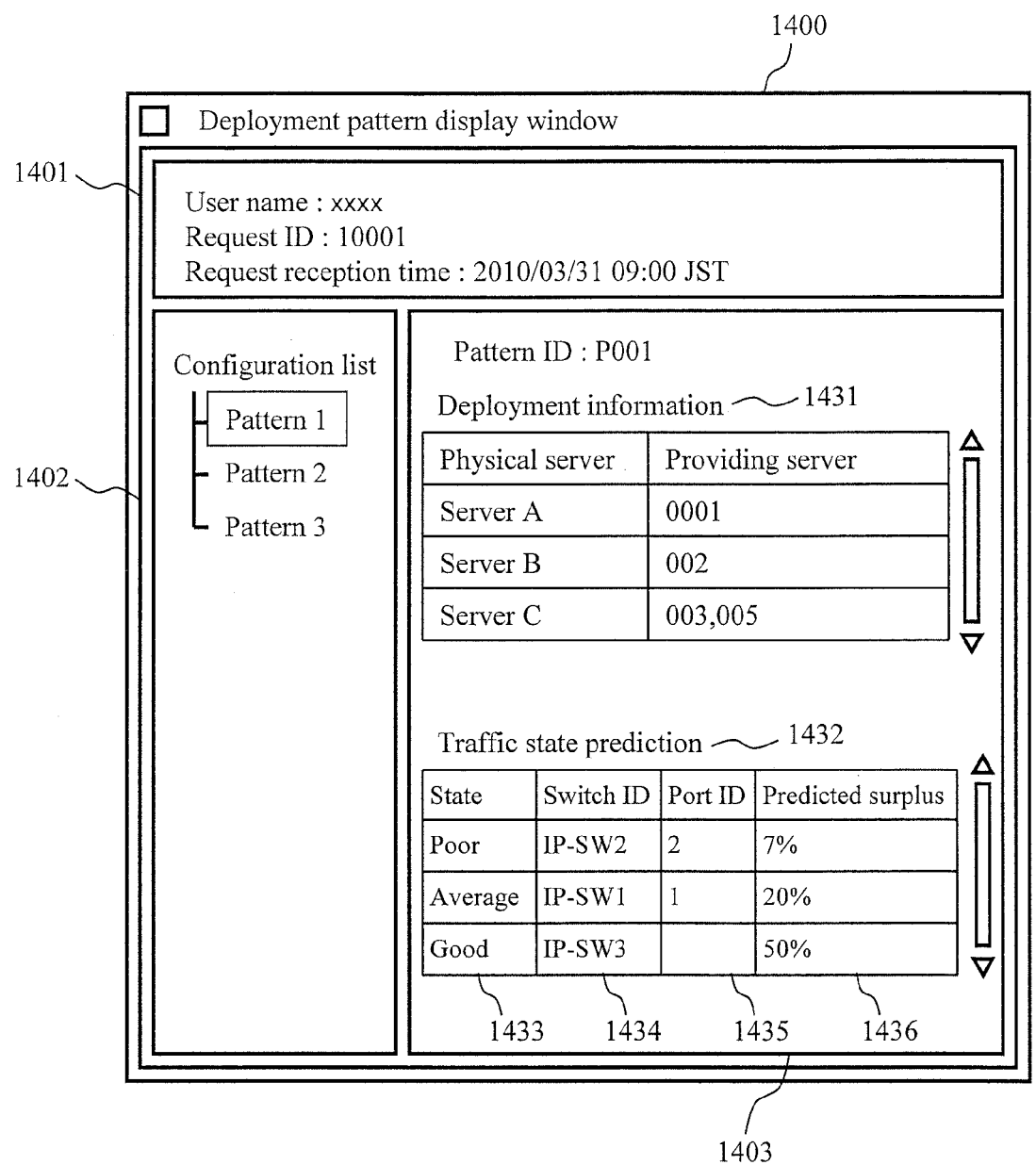
FIG. 14 is a diagram showing an exemplary arrangement of a monitoring screen for displaying available virtual servers and variation of the traffics thereof for the IT system requested by the user in the first embodiment of the present invention.

FIG. 14 is a diagram showing an aspect of a display of the information displayed in accordance with a request from the user. The display window 1400 is a screen that is displayed in response to a request from the user, and includes an area 1401 for checking the information regarding the request, an area 1402 for displaying an index for the deployment patterns acquired from the request, and an area 1403 for displaying the detailed information on one of the deployment patterns.

The area 1402 for displaying the index for the deployment patterns is a region for displaying a list of the candidate deployment patterns. In this region, the deployment patterns considered more efficient are displayed in the upper places.

The area 1403 for displaying the details of the deployment pattern is displayed when one of the deployment patterns is selected in the area 1402 that displays the index of the deployment patterns. The area 1403 displays deployment information 1431 that indicates the physical servers to host the virtual servers to be provided, and traffic state prediction 1432 that displays how the network feature changes when the virtual servers of the deployment pattern are deployed respectively.

The traffic state prediction 1432 includes State 1433 for predicting the states of the switches when the business system is built with the deployment pattern, Switch ID 1434 for identifying the switches, Port ID 1435 for identifying the ports to be predicted, and Predicted Surplus 1436 for indicating the ratio of the surplus after the deployment as the configuration items. In the calculation of the traffic predictions after the deployment, if the peak value of the switch is likely to exceed the switch's own transfer bandwidth, "poor" is displayed in the field of State 1433 to indicate that the segment is the point of a high risk of the bottleneck; if the peak value of the switch does not exceed the switch's own bandwidth but the used bandwidth at the peak hour is close to the switch's own transfer bandwidth, "average" is displayed; and for all the other states, "good" is displayed. "Average" is configured to the state where the used bandwidth at the peak hour is between 70%-99% of the switch's own transfer bandwidth. This value may be default or may be changed from outside.

Here, the calculation of the traffic after the deployment is carried out by using the value of Predicted Traffic 632 in Communication Feature 605 in the System Configuration Request table 600. In this embodiment, the value may be used as it is. In another embodiment, the value which is obtained by changing the distribution ratio of the traffic based on the roles used in obtaining the level of the overlap may be used.

(2) Second Embodiment

The second embodiment of the present invention relates to an approach of deploying the virtual server for stably providing traffic in a SAN environment. In this embodiment, it is assumed that volumes are allowed to be directly allocated to the virtual servers.

The system configuration of the second embodiment is the same as that of the first embodiment shown in FIG. 2. The second embodiment is the same as the first embodiment except for the processing by the resource providing program 221 stored in the program memory 220.

Figure 15:
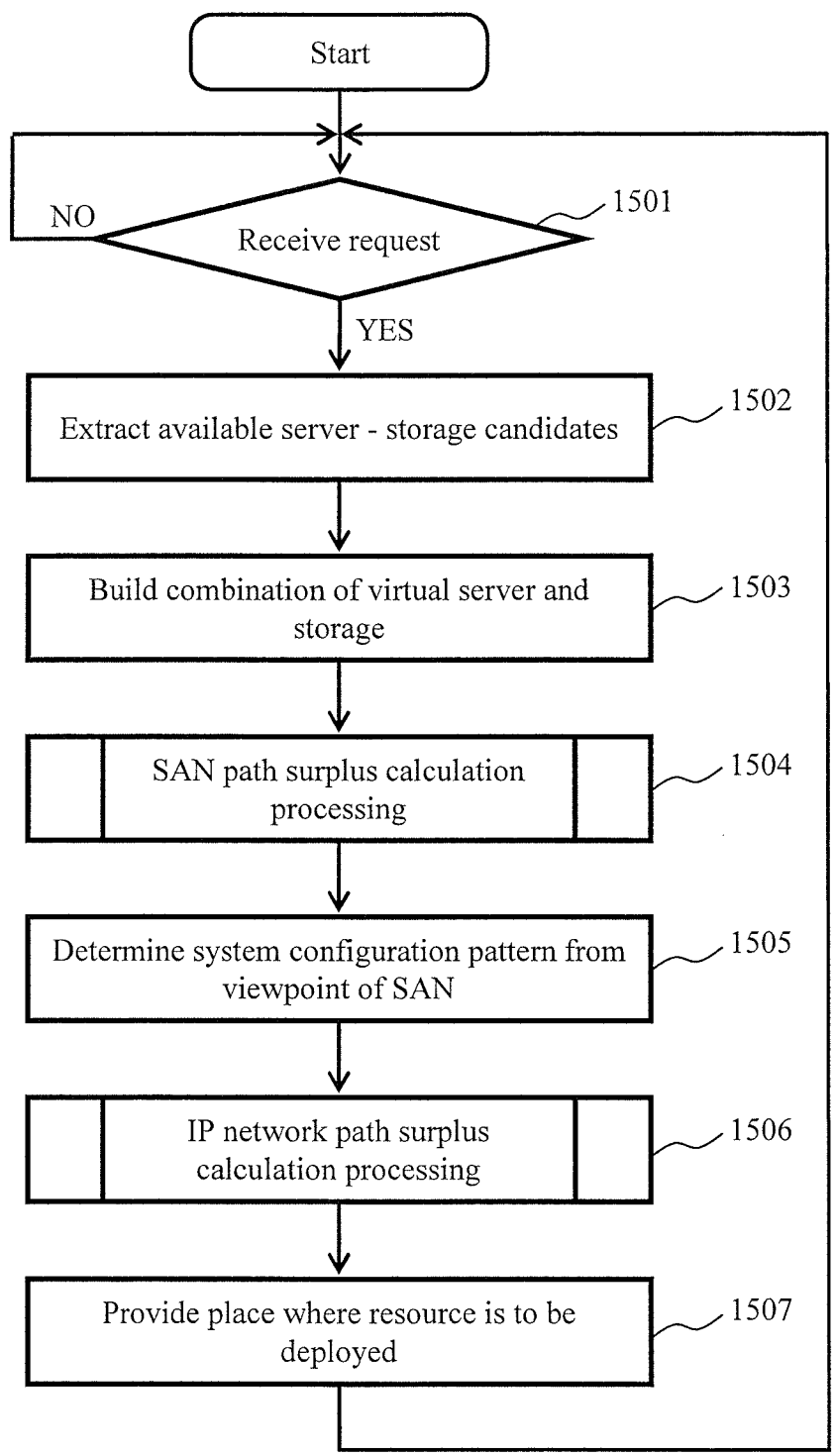
FIG. 15 is a flow chart for describing the processing of a resource-providing program in a second embodiment of the present invention.

FIG. 15 is a flow chart for describing the processing of the resource providing program 221 of the present invention. The resource providing program 221 is read in the work memory 230 and executed by the CPU 240. The processing of the second embodiment differs from that of the first embodiment in the order of executing the IP network path surplus calculation processing and the SAN path surplus calculation processing. As paths are more freely decided in the SAN environment, the SAN path surplus calculation processing is executed first in the second embodiment. That is, where the improvement of the efficiency of the I/O processing is placed first, it is preferable to execute the SAN path surplus calculation processing first. This is because the unstable SAN path (fluctuation of SAN path) slows down the disk I/O processing. On the other hand, where the improvement of the efficiency of the network is placed first (i.e., the communication between the servers is considered important), it is preferable to execute the IP network path surplus calculation processing first.

First, the resource providing program 221 receives a resource providing request from an administrator or user (step 1501). The resource providing request is the same information as the system configuration request table 600 (see FIG. 6) shown in the first embodiment.

When the resource providing program 221 receives the resource providing request, it determines the combination of the physical server and the storage devices that meets the request, where the volume to be provided for the virtual servers is allocated to the storage devices (step 1502). Here, as in the first embodiment, the program acquires the configuration management information from the disk drive (database) 250 to recognize the resource allocation state of the physical servers in the object of management. Then, the program obtains the candidates for the deployment pattern of the physical servers that can host the requested virtual servers. Also, the program determines the storage device that has enough volume to install the virtual servers based on the capacity and the load of the storage device. Here, the program may extract all the patterns according to the system configuration or may offer as the selection candidates the configuration patterns which can most efficiently use the resource from the viewpoint of static configuration information by the number of N from the configuration pattern considered the most efficient. In either case, it is assumed that the deployment locations for all the virtual servers are decided for each candidate plan.

FIG. 16 is a diagram showing an aspect of the deployment pattern table that is extracted by executing step 1502. The table is similar to the deployment pattern table (FIG. 7) of the first embodiment except that storage information 1601 for providing the volume is added in the table in FIG. 16. The storage information 1601 indicates the information on the storage that can be allocated to the virtual servers, and includes Corresponding Server ID 1611 for identifying the corresponding virtual server, ID 1612 for indicating the identifier at the server side for allocating the volume to the virtual server like WWN (World Wide Name) in the SAN environment, and Storage device list 1613 that can provide the volume as the configuration items. The storage information 1601 contains information regarding the virtual servers that use the storage devices among the virtual servers in the system configuration.

Subsequently, the resource providing program 221 generates the combination of the virtual servers predicted from the storage information 1601 and the storage pattern that provides the volume for the predicted virtual servers (step 1503).

Based on the generated server-storage pattern, the resource providing program 221 executes the SAN path surplus calculation processing (step 1504). This is similar to the SAN path surplus calculation processing (step 505) of the first embodiment. The only difference is that the surplus of the storage is obtained for the pattern obtained by the IP network path surplus calculation processing in the first embodiment, whereas the surplus is obtained for the above-mentioned server-storage pattern in the second embodiment.

When the SAN path surplus calculation processing (step 1504) ends, the resource providing program 221 determines the deployment pattern that configures the effective traffic among the patterns (step 1505). This is determined based on the surplus and the variance values like the system configuration pattern from the viewpoint of the IP network of the first embodiment.

When the deployment pattern from the viewpoint of the SAN is determined, the resource providing program 221 executes the IP network path surplus calculation processing (step 1506). This is the same processing as the IP network path surplus calculation processing (step 503) of the first embodiment.

Then, the resource providing program 221 provides the candidates for the deployment location of the resource based on the traffic pattern determined by the IP network path surplus calculation processing (step 1506) for the administrator or user (step 1507).

(3) Conclusion

Conclusion of the First Embodiment

As mentioned above, the first embodiment identifies the parts in the IP network and the storage network (SAN) which have the small surpluses of the amount of available bandwidths for a plurality of deployment patterns (FIG. 7), and determines the deployment pattern that provides the part which has the small variance of the amount of available bandwidth in the past the best deployment pattern. Particularly, the first embodiment identifies a plurality of good patterns in the IP network at first, and then identifies the best pattern among them in the SAN. According to the processing, the first embodiment is capable of identifying the system configuration candidate that is quite unlikely to have a bottleneck in the network traffic in the IT system by determination based on the current traffic performance of peak hour, average value, and variance when a new IT system is built in the IT system (business system) that includes a physical server, storage device, and network device.

Although the statistical information is calculated by the statistical information calculating program 222 in advance in the first embodiment, the information may be calculated by the resource providing program 221 when the program is executed. Specifically, in the first embodiment, the resource providing program 225 acquires the average value and the variance value from the disk drive (database) 250 in order to obtain the surplus in step 1007 shown in FIG. 10 and step 1308 shown in FIG. 13, the first embodiment may be adapted to have the program also calculate variance information based on the performance information of the ports of the object device. Accordingly, the first embodiment is capable of reducing the processing load during the non-peak hour.

Although the performance information is collected for all the ports in the first embodiment, the embodiment may be adapted to have the administrator who recognizes the topology in advance specify the point that is likely to be the bottleneck so that the performance information is collected only for the specified point and the variance processing is calculated only for the point. For example, when the network of a group of routers for routing, which is broadband, is used and it is known that the bottleneck is likely to occur at the part near the physical servers, the performance information on the group of routers needs not to be collected. Accordingly, for a new IT system, the processing of the first embodiment only needs to determine the specified point on the path. As the program does not need to acquire performance information for all the paths in this case, the embodiment can reduce the computational complexity of the system management apparatus.

Conclusion of the Second Embodiment

As mentioned above, the second embodiment identifies the parts in the storage network (SAN) which have the small surpluses of the amount of available bandwidths for a plurality of deployment patterns (FIG. 7) at first, narrows down the plurality of deployment patterns that provide the part which has the small variance of the amount of available bandwidths in the past, determines the part which has the small surplus of the amount of the available bandwidth in the IP network from the narrowed down candidate deployment patterns, and provides the pattern which provides the part which has the small variance of the amount of available bandwidth as the best pattern. According to the processing, the second embodiment is capable of building a system by placing priority on stably providing the performance of accessing the hard disk at first. Therefore, the second embodiment is capable of building the configuration which does not deteriorate the I/O performance of the server, the important element of which is accessing the hard disk like a database server.

Another aspect of the second embodiment is that the SAN environment is the IP-SAN. In this case, as the information on the path between the server and the storage is the IP network, the second embodiment can be implemented by the same processing as that of the approach for obtaining the connecting relations between the servers.

Other Embodiments

The present invention can also be implemented by supplying program codes of software realizing the functions of the foregoing embodiments. In this case, a storage medium, storing the program codes of software, is provided to a system or apparatus, and a computer (or a CPU or MPU) of the system or the apparatus reads the program codes stored in the storage medium. In this case, the program codes read from the storage medium realize the functions according to the foregoing embodiments, and the program codes and the storage medium storing the program codes constitute the invention. Examples of storage medium for supplying the program codes include a flexible disk, a CD-ROM, a DVD-ROM, a hard disk, an optical disk, a magneto-optical disk, a CD-R, a magnetic tape, a non-volatile memory card, and a ROM.

The present invention also includes a case where an OS (operating system) or the like working on the computer performs part or the entire processes in accordance with designations of the program codes and realizes the functions according to the above embodiments. Further, the present invention also includes a case where the program codes read from the storage medium are written in memory of the computer, and a CPU or the like of the computer performs part or the entire processes in accordance with designations of the program codes and realizes the functions according to the above embodiments.

The present invention also includes a case where the program codes of software, which realizes the functions according to the above embodiments, are distributed over a network, stored in a storage means such as a hard disk, memory, and the like of the system or apparatus, or a storage medium such as a CD-RW, a CD-R, and the like so that the computer (or a CPU or MPU) of the system or the apparatus reads and executes the program codes stored in the storage means or storage medium when the invention is to be used.

What is claimed is:

1. A system management method for managing an Information Technology (IT) system, the IT system comprising a plurality of managed devices and a management apparatus that manages the plurality of managed devices, wherein the plurality of managed devices include physical servers, Internet Protocol (IP) switches, Storage Area Network (SAN) switches, and storage devices, the method comprising:
   (1) acquiring, by the management apparatus, configuration information for recognizing configurations of the managed devices, and
   (2) determining, by the management apparatus, configuration candidate patterns which indicate connecting configuration candidates between the plurality of managed devices for realizing a requested system configuration; and
   (3) determining, from the configuration candidate patterns, a configuration pattern using at least the following value about each configuration candidate pattern;
   (3a) a first variance of a used IP network bandwidth at a first part where an IP network bandwidth surplus is the smallest in an IP network part of each configuration candidate pattern; and
   (3b) a second variance of a used SAN bandwidth at a second part where a SAN bandwidth surplus is the smallest in a SAN part of each configuration candidate pattern.

2. The system management method according to claim 1, further comprising:
   (4) displaying the determined configuration pattern and a predicted traffic state of the determined configuration pattern using at least the IP network bandwidth surplus and the SAN bandwidth surplus.

3. The system management method according to claim 1, wherein step (3) of determining the configuration pattern further comprises calculating, by the management apparatus, the second variance for at least one configuration candidate pattern which satisfies a condition using at least the IP network bandwidth surplus and the first variance, so that a configuration of the IP network part is prioritized higher than a configuration of the SAN part.

4. The system management method according to claim 3, wherein determining the at least one configuration candidate pattern includes evaluating, by the management apparatus, the IP network bandwidth surplus and then the first variance.

5. The system management method according to claim 1, wherein step (3) of determining the configuration pattern further comprises calculating, by the management apparatus, the first variance for at least one configuration candidate pattern which satisfies a condition at least using the SAN bandwidth surplus and the second variance, so that a configuration of the SAN part is prioritized higher than a configuration of the IP network part.

6. The system management method according to claim 5, wherein determining the at least one configuration candidate pattern includes evaluating, by the management apparatus, the SAN bandwidth surplus and then the second variance.

7. A management apparatus which manages a plurality of managed devices including physical servers, Internet Protocol (IP) switches, Storage Area Network (SAN) switches, and storage devices, the management apparatus comprising:
   a storage resource storing a management program and configuration information; and
   a processor that executes steps of:
   (1) determining configuration candidate patterns which indicate connecting configuration candidates between the plurality of managed devices for realizing a requested system configuration; and
   (2) determining, from the configuration candidate patterns, a configuration pattern using at least the following values about each configuration candidate pattern:
   (2a) a first variance of a used IP network bandwidth at a first part where an IP network bandwidth surplus is the smallest in an IP network part of each configuration candidate pattern; and
   (2b) a second variance of a used SAN bandwidth at a second part where a SAN bandwidth surplus is the smallest in a SAN part of each configuration candidate pattern.

8. The management apparatus according to claim 7, wherein the processor further executes steps of:
   (3) displaying the determined configuration pattern and a predicted traffic state of the determined configuration pattern using at least the IP network bandwidth surplus and the SAN bandwidth surplus.

9. The management apparatus according to claim 7, wherein step (2) of determining the configuration pattern includes calculating, by the management apparatus, the second variance for at least one configuration candidate pattern which satisfies a condition using at least the IP network bandwidth surplus and the first variance, so that a configuration of the IP network part is prioritized higher than a configuration of the SAN part.

10. The management apparatus according to claim 9, wherein determining the at least one configuration candidate pattern includes evaluating, by the management apparatus, the IP network bandwidth surplus and then the first variance.

11. The management apparatus according to claim 7, wherein step (2) of determining the configuration pattern includes calculating, by the management apparatus, the first variance for at least one configuration candidate pattern which satisfies a condition using at least the SAN bandwidth surplus and the second variance, so that a configuration of the SAN part is prioritized higher than a configuration of the IP network part.

12. The management apparatus according to claim 11, wherein determining the at least one configuration candidate pattern includes evaluating, by the management apparatus, the SAN bandwidth surplus and then the second variance.

13. A non-transitory computer readable medium storing computer-executable instructions for a management apparatus, wherein when executed, the computer-executable instructions cause the management apparatus to perform steps of:

(1) acquiring configuration information for recognizing configurations of a plurality of managed devices, the plurality of managed devices including physical servers, Internet Protocol (IP) switches, Storage Area Network (SAN) switches, and storage devices;
(2) determining configuration candidate patterns which indicate connecting configuration candidates between the plurality of managed devices for realizing a requested system configuration; and
(3) determining, from the configuration candidate patterns, a configuration pattern using at least the following values about each configuration candidate pattern:
(3a) a first variance of a used IP network bandwidth at a first part where an IP network bandwidth surplus is the smallest in an IP network part of each configuration candidate pattern; and
(3b) a second variance of a used SAN bandwidth at a second part where a SAN bandwidth surplus is the smallest in a SAN part of each configuration candidate pattern.

14. The non-transitory computer readable medium according to claim 13, the computer-executable instructions causing the management apparatus to further perform a step of:
(4) displaying the determined configuration pattern and a predicted traffic state of the determined configuration pattern using at least the IP network bandwidth surplus and the SAN bandwidth surplus.

15. The non-transitory computer readable medium according to claim 13,
wherein step (3) of determining the configuration pattern includes calculating, by the management apparatus, the second variance for at least one configuration candidate pattern which satisfies a condition using at least the IP network bandwidth surplus and the first variance, so that a configuration of the IP network part is prioritized higher than a configuration of the SAN part.

16. The non-transitory computer readable medium according to claim 15,
wherein determining the at least one configuration candidate pattern includes evaluating, by the management apparatus, the IP network bandwidth surplus and then the first variance.

17. The non-transitory computer readable medium according to claim 13,
wherein step (3) of determining the configuration pattern includes calculating, by the management apparatus, the first variance for at least one configuration candidate pattern which satisfies a condition using at least the SAN bandwidth surplus and the second variance, so that a configuration of the SAN part is prioritized higher than a configuration of the IP network part.

18. The non-transitory computer readable medium according to claim 17,
wherein, determining the at least one configuration candidate pattern includes evaluating, by the management apparatus, the SAN bandwidth surplus and then the second variance.

* * * * *